US010815910B2

United States Patent
Masuda et al.

(10) Patent No.: US 10,815,910 B2
(45) Date of Patent: Oct. 27, 2020

(54) CONTROL DEVICE FOR COMPRESSION IGNITION ENGINE

(71) Applicant: Mazda Motor Corporation, Aki-gun, Hiroshima (JP)

(72) Inventors: Yuta Masuda, Hiroshima (JP); Masayoshi Higashio, Hiroshima (JP); Yugou Sunagare, Hiroshima (JP); Michio Ito, Hatsukaichi (JP); Kenko Ujihara, Higashihiroshima (JP); Yuto Matsushima, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/450,704

(22) Filed: Jun. 24, 2019

(65) Prior Publication Data

US 2020/0032720 A1 Jan. 30, 2020

(30) Foreign Application Priority Data

Jul. 26, 2018 (JP) .................................. 2018-140637

(51) Int. Cl.
*F02D 41/30* (2006.01)
*F02D 17/02* (2006.01)
(Continued)

(52) U.S. Cl.
CPC .............. *F02D 17/02* (2013.01); *F02B 31/06* (2013.01); *F02D 13/0203* (2013.01);
(Continued)

(58) Field of Classification Search
CPC .. F02D 17/02; F02D 13/0203; F02D 41/0002; F02D 41/3017; F02D 41/38;
(Continued)

(56) References Cited

U.S. PATENT DOCUMENTS

| 2001/0015065 A1 | 8/2001 | Ide |
| 2005/0193980 A1 | 9/2005 | Doering |

(Continued)

FOREIGN PATENT DOCUMENTS

| EP | 1707791 A2 | 10/2006 |
| EP | 3418538 A1 | 12/2018 |
| WO | 2018096744 A1 | 5/2018 |

OTHER PUBLICATIONS

European Patent Office, Extended European Search Report Issued in Application No. 19186906.4, dated Dec. 9, 2019, Germany, 11 pages.

*Primary Examiner* — Hai H Huynh
(74) *Attorney, Agent, or Firm* — Alleman Hall Creasman & Tuttle LLP

(57) ABSTRACT

A control system for a compression ignition engine is provided, which includes a sensor and a cylinder count control module which changes between all-cylinder and reduced-cylinder operations when the compression ignition combustion is performed at a given lean air-fuel ratio. The cylinder count control module executes a preparation control to change from the all-cylinder operation to the reduced-cylinder operation when the change is demanded. In the preparation control, the cylinder count control module outputs a signal to a throttle valve to execute an air amount increase processing, outputs a signal to a fuel injection valve to execute a fuel amount increase processing, and outputs a signal to an ignition plug to execute a retard processing. The cylinder count control module ends the fuel amount increase processing and the retard processing when it is determined that an air-fuel ratio is in a given air-fuel ratio state, and starts the reduced-cylinder operation.

9 Claims, 21 Drawing Sheets

(51) Int. Cl.

| | | |
|---|---|---|
| *F02B 31/06* | (2006.01) | |
| *F02D 13/02* | (2006.01) | |
| *F02D 41/00* | (2006.01) | |
| *F02D 41/38* | (2006.01) | |
| *F02P 5/04* | (2006.01) | |
| *F02P 5/15* | (2006.01) | |

(52) U.S. Cl.
CPC ..... *F02D 41/0002* (2013.01); *F02D 41/3017* (2013.01); *F02D 41/38* (2013.01); *F02P 5/045* (2013.01); *F02P 5/15* (2013.01)

(58) Field of Classification Search
CPC .. F02D 41/40; F02D 41/0087; F02D 41/3041; F02D 37/02; F02D 2250/21; F02B 31/06; F02P 5/15; F02P 5/045
USPC ........ 123/481, 198 F, 198 DB, 198 DC, 399, 123/406.45
See application file for complete search history.

(56) References Cited

U.S. PATENT DOCUMENTS

| | | | |
|---|---|---|---|
| 2006/0196463 | A1 | 9/2006 | Pallett et al. |
| 2017/0292462 | A1* | 10/2017 | Tsuda ...................... F02B 11/00 |
| 2019/0063337 | A1 | 2/2019 | Inoue et al. |

* cited by examiner

CONTROL DEVICE FOR COMPRESSION IGNITION ENGINE

TECHNICAL FIELD

The disclosed technology relates to a control device for a compression ignition engine.

BACKGROUND OF THE DISCLOSURE

It is known that combustion by compressed self-ignition in which a mixture gas combusts at once without flame propagation being intervened maximizes fuel efficiency because of the shortest combustion period. However, various problems of the combustion by compressed self-ignition need to be solved to be applied to automobile engines. For example, since the operating state and the environmental condition vary largely in the automotive application, it is a large problem to carry out a stable compressed self-ignition. In the automobile engines, the combustion by compressed self-ignition has not yet put in practical use.

In order to solve this problem, for example, WO2018/096744A1 proposes SPCCI (SPark Controlled Compression Ignition) combustion in which SI (Spark Ignition) combustion and CI (Compression Ignition) combustion are combined. SI combustion is combustion accompanied by the flame propagation started by forcibly igniting the mixture gas inside a combustion chamber. CI combustion is combustion started by compression ignition of the mixture gas inside the combustion chamber. SPCCI combustion is combustion in which the mixture gas inside the combustion chamber is forcibly ignited to start the combustion by flame propagation, and unburnt mixture gas inside the combustion chamber then combusts by compression ignition due to a pressure buildup caused by generation of heat and flame propagation of the SI combustion. Since SPCCI combustion includes the CI combustion, it is one form of "combustion by compression-ignition."

CI combustion in SPCCI combustion takes place when the in-cylinder temperature reaches the ignition temperature which is defined by the composition of the mixture gas. Fuel efficiency can be maximized if the in-cylinder temperature reaches the ignition temperature near a compression top dead center and CI combustion takes place. The in-cylinder temperature increases according to an increase in the in-cylinder pressure. The in-cylinder pressure during SPCCI combustion is a result of two pressure buildups comprised of a pressure buildup by a compression work of a piston during a compression stroke and a pressure buildup caused by the generation of heat during the SI combustion.

Since SPCCI combustion is one form of compression ignition combustion, stable combustion is possible even if the air-fuel ratio of the mixture gas is made leaner than a stoichiometric air fuel ratio, as also disclosed in WO2018/096744A1. The engine which performs SPCCI combustion can be operated at high thermal efficiency, while suppressing the generation of raw $NO_x$ by making the air-fuel ratio of the mixture gas 25:1 or higher.

When such an engine operates in an operating range at a low load, since the fuel amount is little, the air-fuel ratio becomes excessively lean and the stable CI combustion may become difficult. Therefore, the present inventors considered that fuel injections are stopped in some of a plurality of combustion chambers where combustion is performed (a so-called "fuel cutoff") to change the operation from an all-cylinder operation in which all the combustion chambers perform combustion to a reduced-cylinder operation in which only some of the combustion chambers perform combustion.

However, in such a case, the air amount and the fuel amount are different greatly between the all-cylinder operation and the reduced-cylinder operation. Thus, the air amount and the fuel amount have to be changed according to the respective operations, while reducing fluctuations of torque (torque shock). In that case, there is a problem such that raw $NO_x$ is generated or the combustion becomes unstable.

For example, when changing from the all-cylinder operation to the reduced-cylinder operation, the number of combustion chambers where combustion is performed decreases. Thus, in order to reduce the torque fluctuations while maintaining the total amount of fuel supplied to the engine, it is necessary to relatively increase the fuel amount supplied to the combustion chambers where combustion is performed, and the total amount of air supplied to the engine also have to be increased accordingly.

Regarding the increase in air, it takes place with a delay with respect to the increase in fuel because of the structural reasons. Therefore, if the operation is changed instantly, the air-fuel ratio of the mixture gas increases immediately to generate raw $NO_x$. On the other hand, if a certain change period (a preparation period) is provided and the operation is changed after the increase in air, raw $NO_x$ will not be generated, but the stable SPCCI combustion becomes difficult because the air-fuel ratio becomes excessively leaner.

On the contrary, when changing from the reduced-cylinder operation to the all-cylinder operation, the number of combustion chambers where combustion is performed increases. Therefore, in order to reduce the torque fluctuations while maintaining the total amount of fuel supplied to the engine, it is necessary to relatively decrease the fuel amount supplied to each combustion chamber, and the total amount of air supplied to the engine must also be decreased accordingly.

Therefore, in this case, if the operation is changed instantly, the air-fuel ratio of the mixture gas becomes excessively lean and the stable SPCCI combustion becomes difficult. On the other hand, if the certain change period (preparation period) is provided and the operation is changed after the reduction in air, raw $NO_x$ will be generated.

SUMMARY OF THE DISCLOSURE

Therefore, one purpose of the technology disclosed herein is to provide a control device for an engine which performs given compression ignition combustion at a lean air-fuel ratio, which is capable of smoothly changing an engine operation between an all-cylinder operation and a reduced-cylinder operation, while preventing a degradation of an emission performance of the engine.

According to one aspect of the present disclosure, a control device for a compression ignition engine is provided. The engine includes a plurality of cylinders, pistons configured to reciprocate inside the plurality of cylinders, respectively, a plurality of combustion chambers, each defined in the cylinder so that displacement of the combustion chamber changes according to the reciprocation of the piston, a throttle valve configured to adjust an amount of air supplied into each of the combustion chambers, ignition plugs disposed so as to be oriented to the respective combustion chambers, and fuel injection valves configured to inject fuel into the respective combustion chambers.

The control device includes circuitry and a sensor configured to measure a parameter relevant to operation of the engine, and the control device is configured to execute a cylinder count control module connected with the throttle valve, the ignition plug, the fuel injection valve, and the sensor, to output signals to the throttle valve, the ignition plug, and the fuel injection valve based on the signal inputted from the sensor so that the compression ignition combustion is started by the ignition plug igniting a mixture gas formed by the fuel injection valve injecting fuel into each of the combustion chambers, and configured to change between an all-cylinder operation in which combustion is performed in all of the plurality of combustion chambers and a reduced-cylinder operation in which combustion is not performed in some of the combustion chambers by suspending the fuel injection into the combustion chambers, according to an operating state of the engine, when the compression ignition combustion is performed at a given lean air-fuel ratio higher than a stoichiometric air fuel ratio.

Note that the number of the combustion chambers is not limited, and depends on the specification of the engine. Similarly, the number of the combustion chambers concerning the reduced-cylinder operation is not limited. The lean air-fuel ratio used herein is, for example, 25:1 or higher.

The cylinder count control module executes a preparation control to change operation of the engine from the all-cylinder operation to the reduced-cylinder operation when a change demand from the all-cylinder operation to the reduced-cylinder operation is received. In the preparation control, the cylinder count control module outputs the signal to the throttle valve to execute an air amount increase processing in which an amount of air supplied to each of the combustion chambers is increased, compared with the amount of air before the preparation control is started, the cylinder count control module outputs the signal to the fuel injection valve to execute a fuel amount increase processing in which an amount of fuel injected into each of the combustion chambers is increased, compared with the amount of fuel before the preparation control is started, the cylinder count control module outputs the signal to the ignition plug to execute a retard processing in which the ignition timing is retarded, and the cylinder count control module ends the fuel amount increase processing and the retard processing when the cylinder count control module determines that an air-fuel ratio is in a given air-fuel ratio state where the air amount reaches a given amount, and starts the reduced-cylinder operation.

That is, in such a control device for the compression ignition engine, when changing from the all-cylinder operation to the reduced-cylinder operation, this change is performed by executing a given preparation control, not changing instantly. Therefore, the air amount or the fuel amount does not change suddenly.

Moreover, in the preparation control of the control device, the fuel amount increase processing in which the fuel amount is increased and the retard processing in which the ignition timing is retarded are executed in addition to the air amount increase processing in which the air amount is increased. Since the fuel is increased together with the air, both of the air amount and the fuel amount approach the condition of the reduced-cylinder operation. Thus, a smooth change is possible. Since the change in the air-fuel ratio also becomes small, a stable combustion or suppression of raw $NO_x$ can be achieved.

If the fuel amount is increased, generally the torque outputted from the engine changes. In this regard, according to the control device in which the retard processing is executed, the torque can be kept constant, i.e., the fluctuation of the torque can be avoided.

Moreover, if the operation is changed under a state where the air amount is insufficient, the air-fuel ratio becomes rich and raw $NO_x$ may be generated. Whereas, if the operation is changed under a state where the air amount is excessive, the air-fuel ratio becomes excessively lean and the combustion may be unstable.

In this regard, according to the control device, the fuel amount increase processing and the retard processing are ended when the air-fuel ratio is in the given air-fuel ratio state where the air amount reaches the given amount which is neither excess nor deficiency, and starts the reduced-cylinder operation. Thus, the operation can be changed smoothly, while preventing degradation of emission performance.

According to another aspect of the present disclosure, a control device for a compression ignition engine is provided. The engine includes a plurality of cylinders, pistons configured to reciprocate inside the plurality of cylinders, respectively, a plurality of combustion chambers, each defined in the cylinder so that displacement of the combustion chamber changes according to the reciprocation of the piston, a throttle valve configured to adjust an amount of air supplied into each of the combustion chambers, ignition plugs disposed so as to be oriented to the respective combustion chambers, and fuel injection valves configured to inject fuel into the respective combustion chambers. The control device includes circuitry and a sensor configured to measure a parameter relevant to operation of the engine, and is the controld device is configured to execute a cylinder count control module connected with the throttle valve, the ignition plugs, the fuel injection valves, and the sensor, to output signals to the throttle valve, the ignition plug, and the fuel injection valve based on the signal inputted from the sensor so that the compression ignition combustion is started by the ignition plug igniting a mixture gas formed by the fuel injection valve injecting fuel into each of the combustion chambers, and configured to change between an all-cylinder operation in which combustion is performed in all of the plurality of combustion chambers and a reduced-cylinder operation in which combustion is not performed in some of the combustion chambers by suspending the fuel injection into the combustion chambers, according to an operating state of the engine, when the compression ignition combustion is performed at a given lean air-fuel ratio higher than a stoichiometric air fuel ratio. The cylinder count control module executes a preparation control to change operation of the engine from the all-cylinder operation to the reduced-cylinder operation when a change demand from the all-cylinder operation to the reduced-cylinder operation is received. In the preparation control, the cylinder count control module outputs the signal to the throttle valve to execute an air amount increase processing in which an amount of air supplied to each of the combustion chambers is increased, compared with the amount of air before the preparation control is started, the cylinder count control module outputs the signal to the fuel injection valve to execute a fuel amount maintain processing in which an amount of fuel injected into each of the combustion chambers is maintained, and the cylinder count control module ends the fuel amount maintain processing when the cylinder count control module determines that an air-fuel ratio is in a given air-fuel ratio state where the air amount reaches a given amount, and starts the reduced-cylinder operation.

In the preparation control of the control device, while the air amount is increased, the fuel amount is maintained without being increased. Thus, the air-fuel ratio becomes lean, and if the control is continued, the combustion becomes unstable.

In this regard, according to the control device, the fuel amount maintain processing is ended when the air-fuel ratio is in the given air-fuel ratio state with the air-fuel ratio which is neither excess nor deficiency, and starts the reduced-cylinder operation. Thus, the operation can be changed smoothly, while preventing the degradation of an emission performance.

According to still another aspect of the present disclosure, a control device for a compression ignition engine is provided. The engine includes a plurality of cylinders, pistons configured to reciprocate inside the plurality of cylinders, respectively, a plurality of combustion chambers, each defined in the cylinder so that displacement of the combustion chamber changes according to the reciprocation of the piston, a throttle valve configured to adjust an amount of air supplied into each of the combustion chambers, ignition plugs disposed so as to be oriented to the respective combustion chambers, and fuel injection valves configured to inject fuel into the respective combustion chambers. The control device includes circuitry and a sensor configured to measure a parameter relevant to operation of the engine, and the control device is configured to execute a cylinder count control module connected with the throttle valve, the ignition plug, the fuel injection valve, and the sensor, to output signals to the throttle valve, the ignition plug, and the fuel injection valve based on the signal inputted from the sensor so that the compression ignition combustion is started by the ignition plug igniting a mixture gas formed by the fuel injection valve injecting fuel into each of the combustion chambers, and configured to change between an all-cylinder operation in which combustion is performed in all of the plurality of combustion chambers and a reduced-cylinder operation in which combustion is not performed in some of the combustion chambers by suspending the fuel injection into the combustion chambers, according to an operating state of the engine, when the compression ignition combustion is performed at a given lean air-fuel ratio higher than a stoichiometric air fuel ratio. The cylinder count control module executes a preparation control to change operation of the engine from the reduced-cylinder operation to the all-cylinder operation when a change demand from the reduced-cylinder operation to the all-cylinder operation is received. In the preparation control, the cylinder count control module outputs the signal to the throttle valve to execute an air amount decrease processing in which an amount of air supplied to each of the combustion chambers is decreased, compared with the amount of air before the preparation control is started, the cylinder count control module outputs the signal to the fuel injection valve to execute a fuel amount maintain processing in which an amount of fuel injected into each of the combustion chambers is maintained, and the cylinder count control module ends the fuel amount maintain processing when the cylinder count control module determines that an air-fuel ratio is in a given air-fuel ratio state where the air amount reaches a given amount, and starts the all-cylinder operation.

This control device executes the preparation control to change operation of the engine from the reduced-cylinder operation to the all-cylinder operation when the change demand from the reduced-cylinder operation to the all-cylinder operation is received, which is contrary to the control device described above. In such a preparation control, while the air amount is decreased, the fuel amount is maintained without being decreased.

Thus, the air-fuel ratio becomes rich, and if the control is continued, raw $NO_x$ may be generated.

In this regard, according to this control device, the fuel amount maintain processing is ended when the air-fuel ratio is in the given air-fuel ratio state with the air-fuel ratio neither excess nor deficiency, and starts the all-cylinder operation. Thus, the operation can be changed smoothly, while preventing the degradation of an emission performance.

The air-fuel ratio state may be determined when the cylinder count control module determines that a rich air-fuel ratio defined based on the amount of air, and the amount of fuel injected in the reduced-cylinder operation during the change, reaches a given threshold.

In a case where the total amount of fuel supplied to the engine during the change is maintained substantially constant in order to reduce the torque fluctuations, the fuel amount injected into the combustion chambers in which the combustion is performed in the reduced-cylinder operation becomes larger than the fuel amount injected into the corresponding combustion chambers in the all-cylinder operation. Thus, the air-fuel ratio during the change becomes relatively rich. Therefore, by determining that such an air-fuel ratio during the change (rich air-fuel ratio) reaches the given threshold and by determining the air-fuel ratio state as a reference of the change timing, the change can be possible at an early stage while suppressing raw $NO_x$.

The threshold may be a value lower than the lean air-fuel ratio.

The lean air-fuel ratio is higher than the stoichiometric air-fuel ratio. Thus, if the fuel amount increases relative to the air amount, it may be the air-fuel ratio at which raw $NO_x$ is generated. Therefore, the threshold is set to a suitable rich value lower than the lean air-fuel ratio and, thus, the operation can be changed at the limit before generating raw $NO_x$.

Therefore, the suppression of raw $NO_x$ is possible while securing the combustion stability more reliably.

A restricted retard processing in which an ignition timing is restricted below a retarding amount at that time may be performed after the retard processing reaches the limit.

After the retard processing reaches the limit, if the ignition timing is further retarded, a misfire may occur. Therefore, by restricting the ignition timing below the retarding amount when the retard processing reaches the limit, the misfire caused by the retard processing can be avoided.

A load adjustment processing in which a part of output of the engine is diverted to some other purposes may be performed, in addition to the restricted retard processing.

In a state where the restricted retard processing is executed, if the fuel is continued to be increased, the torque increases and the torque fluctuation may occur. In this regard, according to this control device, since the part of output of the engine is diverted, i.e., used for another purpose different from the generation of the torque, the increase of the fuel amount can be continued while reducing the torque fluctuation even after the retard processing reaches the limit.

The control device may store a given all-cylinder operating range and a given reduced-cylinder operating range. When the operating state of the engine is determined to be within the reduced-cylinder operating range, the control device may perform the reduced-cylinder operation by suspending the fuel injection by the fuel injection valves of some of the cylinders, and opening and closing of intake valves and exhaust valves of the cylinders may be permitted during the reduced-cylinder operation.

DETAILED DESCRIPTION OF THE DISCLOSURE

Hereinafter, one embodiment of the disclosed technology will be described in detail with reference to the accompanying drawings. However, the following description is essentially only illustration and does not limit the present disclosure, its application, nor its use. The following description is one example of an engine and a control device of the engine.

Figure 1:
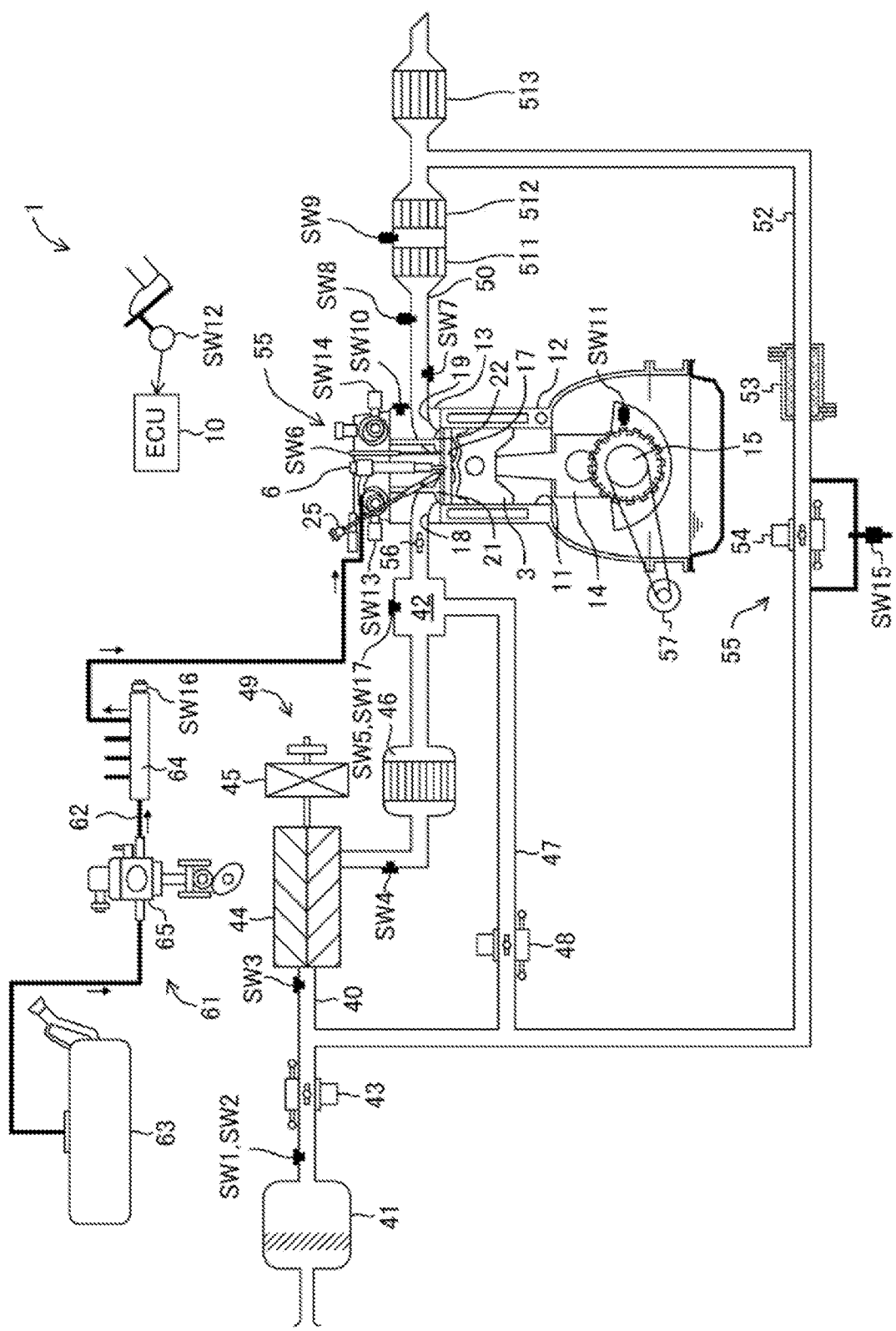
FIG. 1 is a view illustrating a configuration of an engine.
Figure 2:
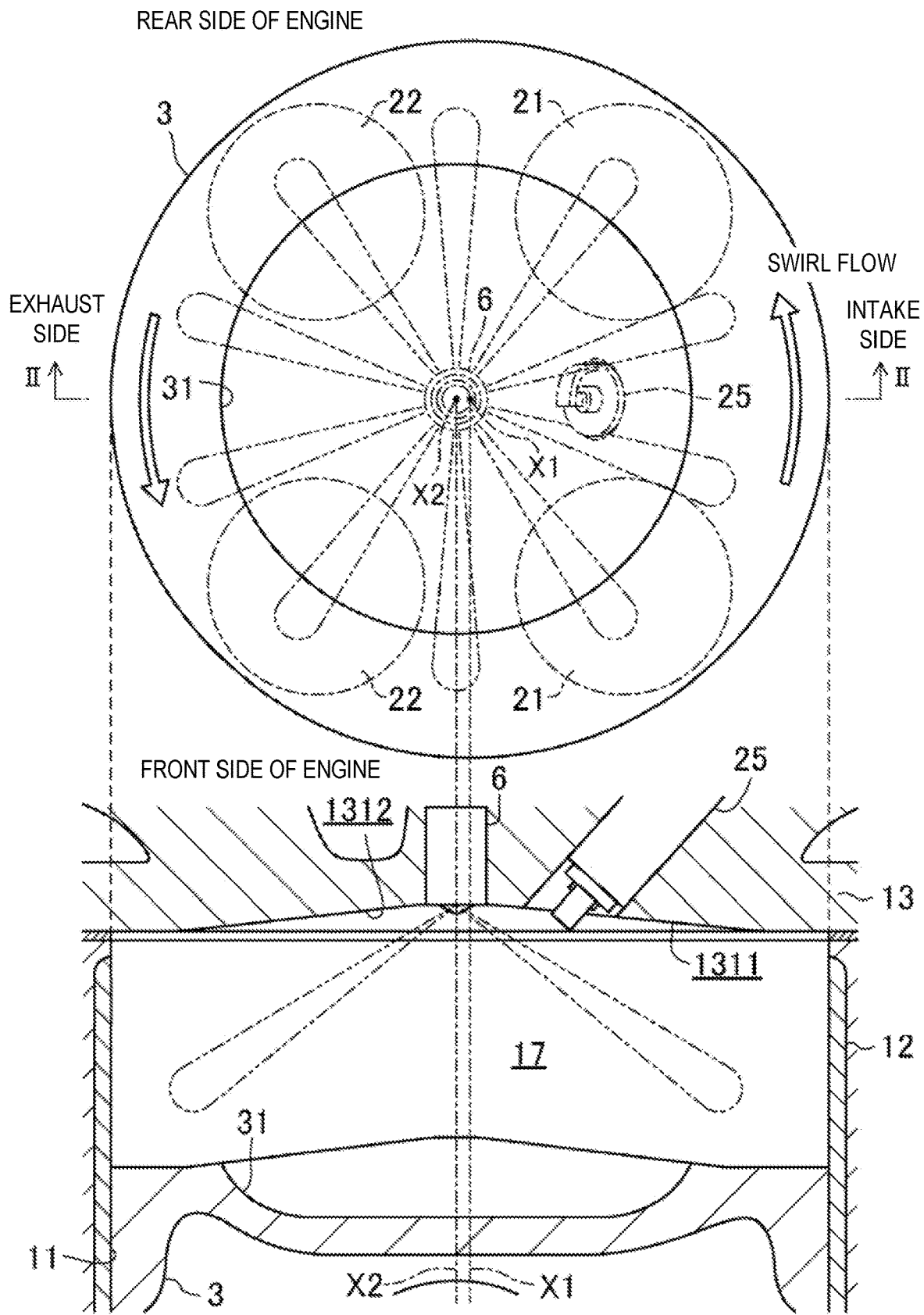
FIG. 2 is a view illustrating a configuration of a combustion chamber, where an upper portion corresponds to a plan view of the combustion chamber, and a lower portion is a cross-sectional view taken along a line II-II.
Figure 3:
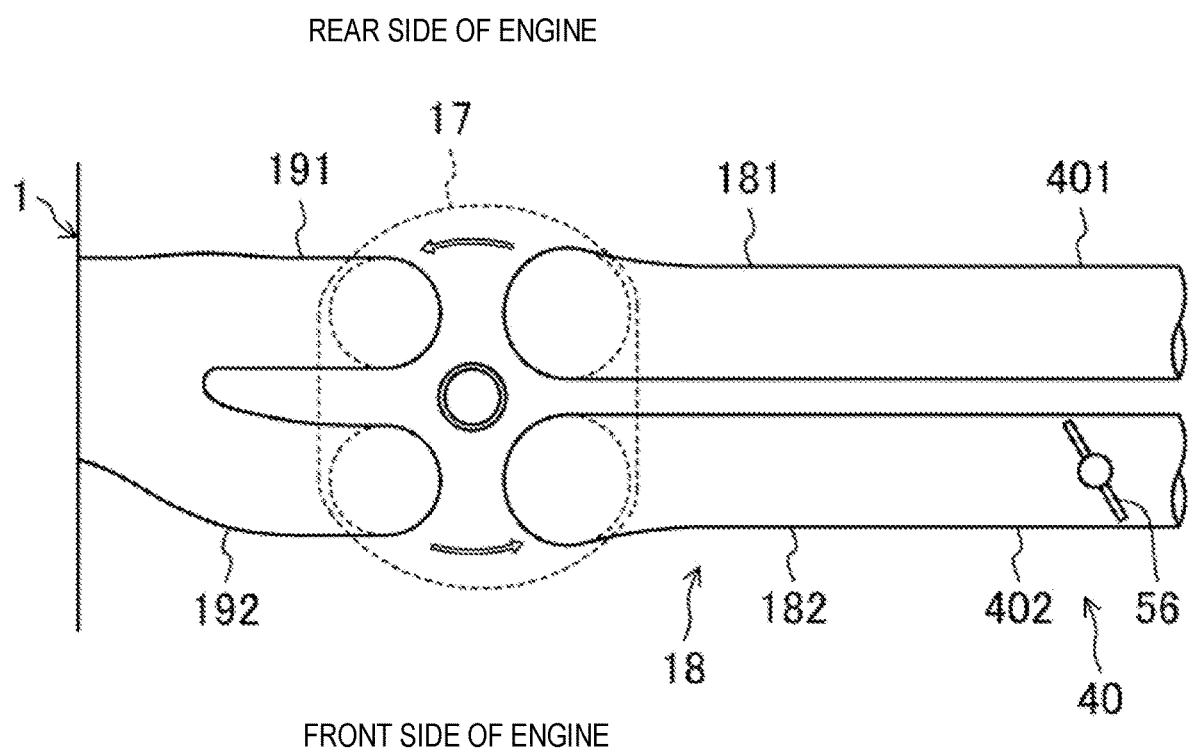
FIG. 3 is a plan view illustrating a configuration of the combustion chamber and an intake system.
Figure 4:
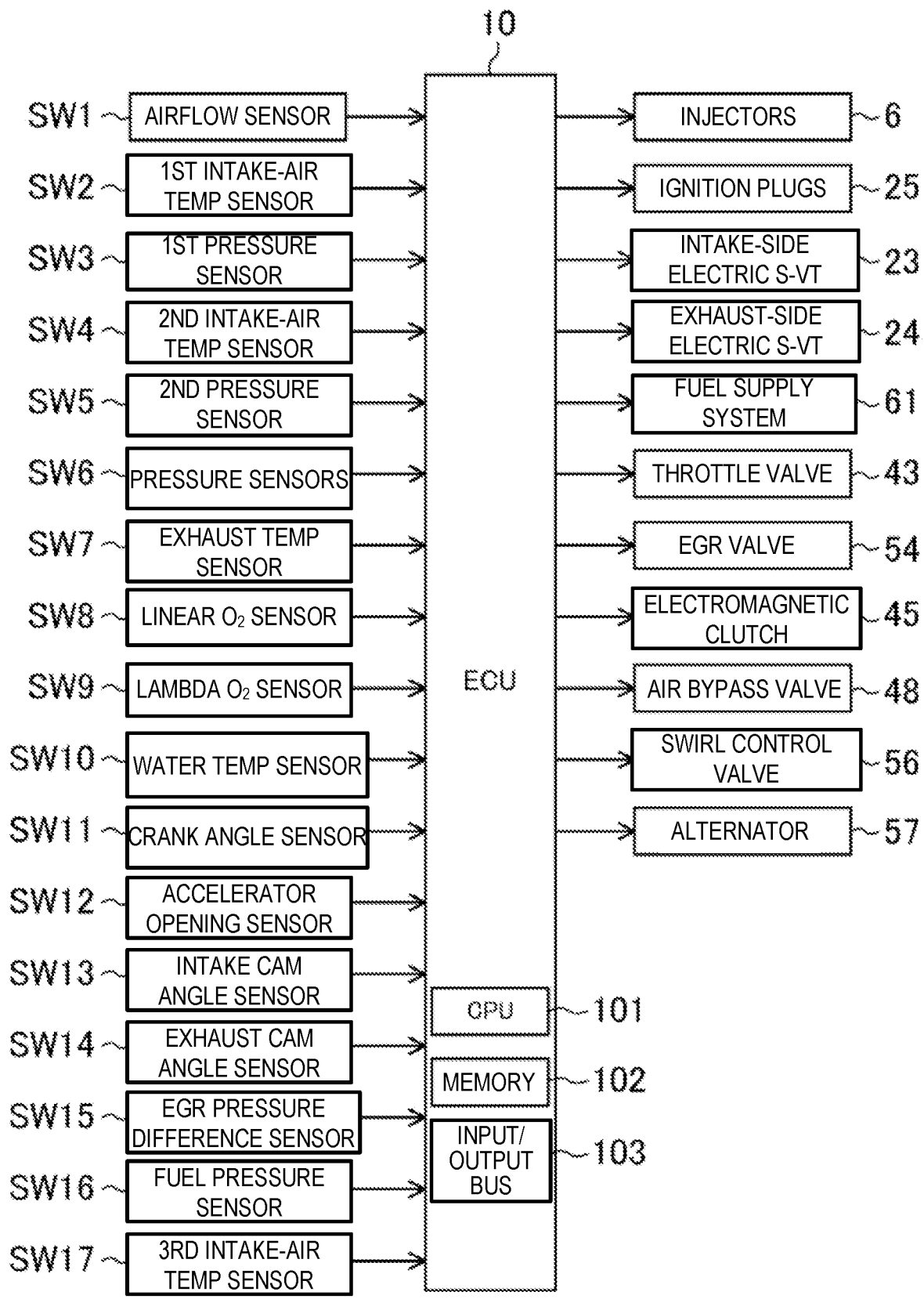
FIG. 4 is a block diagram illustrating a configuration of an engine control device.

FIG. 1 is a view illustrating a configuration of the compression-ignition engine. FIG. 2 is a view illustrating a configuration of a combustion chamber of the engine. FIG. 3 is a view illustrating a configuration of the combustion chamber and an intake system. Note that in FIG. 1, an intake side is the left side in the drawing, and an exhaust side is the right side in the drawing. In FIGS. 2 and 3, the intake side is the right side in the drawings, and the exhaust side is the left side in the drawings. FIG. 4 is a block diagram illustrating a configuration of the control device of the engine.

An engine 1 is a four-stroke engine which operates by combustion chambers 17 repeating an intake stroke, a compression stroke, an expansion stroke, and an exhaust stroke. The engine 1 is mounted on an automobile with four wheels. The automobile travels by operating the engine 1. Fuel of the engine 1 is gasoline in this example. The fuel may be a liquid fuel containing at least gasoline. The fuel may be gasoline containing, for example, bioethanol.

(Engine Configuration)

The engine 1 includes a cylinder block 12 and a cylinder head 13 placed thereon. A plurality of cylinders 11 are formed inside the cylinder block 12. In FIGS. 1 and 2, only one cylinder 11 is illustrated. The engine 1 is a multi-cylinder engine.

A piston 3 is slidably inserted in each cylinder 11. The pistons 3 are connected with a crankshaft 15 through respective connecting rods 14. Each piston 3 defines the combustion chamber 17, together with the cylinder 11 and the cylinder head 13. Note that the term "combustion chamber" may be used in a broad sense. That is, the term "combustion chamber" may refer to a space formed by the piston 3, the cylinder 11, and the cylinder head 13, regardless of the position of the piston 3.

As illustrated in the lower figure of FIG. 2, a lower surface of the cylinder head 13, i.e., a ceiling surface of the combustion chamber 17, is comprised of a slope 1311 and a slope 1312. The slope 1311 is a rising gradient from the intake side toward an injection axial center X2 of an injector 6 (fuel injection valve) which will be described later. The slope 1312 is a rising gradient from the exhaust side toward the injection axial center X2. The ceiling surface of the combustion chamber 17 is a so-called "pent-roof" shape.

An upper surface of the piston 3 is bulged toward the ceiling surface of the combustion chamber 17. A cavity 31 is formed in the upper surface of the piston 3. The cavity 31 is a dent in the upper surface of the piston 3. The cavity 31 has a shallow pan shape in this example. The center of the cavity 31 is offset at the exhaust side with respect to a center axis X1 of the cylinder 11.

A geometric compression ratio of the engine 1 is set 10:1 or higher and 30:1 or lower. The engine 1 which will be described later performs SPCCI (SPark Controlled Compression Ignition) combustion that is a combination of SI (spark ignition) combustion and CI (compression ignition) combustion in a part of operating ranges. SPCCI combustion controls the CI combustion using a heat generation and a pressure buildup by the SI combustion. The engine 1 is the compression-ignition engine. However, in this engine 1, a temperature of the combustion chamber 17, when the piston 3 is at a compression top dead center (i.e., compression end temperature), does not need to be increased. In the engine 1, the geometric compression ratio can be set comparatively low. The low geometric compression ratio becomes advantageous in reduction of cooling loss and mechanical loss. For engines using regular gasoline (low octane fuel of which an octane number is about 91), the geometric compression ratio of the engine 1 is 14:1-17:1, and for those using high octane gasoline (high octane fuel of which the octane number is about 96), the geometric compression ratio is 15:1-18:1.

An intake port 18 is formed in the cylinder head 13 for each cylinder 11. As illustrated in FIG. 3, each intake port 18 has a first intake port 181 and a second intake port 182. The intake port 18 communicates with the corresponding combustion chamber 17. Although detailed illustration of the intake port 18 is omitted, it is a so-called "tumble port." That is, the intake port 18 has such a shape that a tumble flow is formed in the combustion chamber 17.

Each intake valve 21 is disposed in the intake ports 181 and 182. The intake valve 21 opens and closes a channel between the combustion chamber 17 and the intake port 181 or 182. The intake valves 21 are opened and closed at given timings by a valve operating mechanism. The valve operating mechanism may be a variable valve operating mechanism which varies the valve timing and/or valve lift. In this example, as illustrated in FIG. 4, the variable valve operating mechanism has an intake-side electric S-VT (Sequential-Valve Timing) 23. The intake-side electric S-VT 23 continuously varies a rotation phase of an intake cam shaft within a given angle range. The valve open timing and the valve close timing of the intake valve 21 vary continuously. Note that the electric S-VT may be replaced with a hydraulic S-VT, as the intake valve operating mechanism.

An exhaust port 19 is also formed in the cylinder head 13 for each cylinder 11. As illustrated in FIG. 3, each exhaust port 19 also has a first exhaust port 191 and a second exhaust port 192. The exhaust port 19 communicates with the corresponding combustion chamber 17.

Each exhaust valve 22 is disposed in the exhaust ports 191 and 192. The exhaust valve 22 opens and closes a channel between the combustion chamber 17 and the exhaust port 191 or 192. The exhaust valves 22 are opened and closed at a given timing by a valve operating mechanism. The valve operating mechanism may be a variable valve operating mechanism which varies the valve timing and/or valve lift. In this example, as illustrated in FIG. 4, the variable valve operating mechanism has an exhaust-side electric S-VT 24. The exhaust-side electric S-VT 24 continuously varies a rotation phase of an exhaust cam shaft within a given angle range. The valve open timing and the valve close timing of the exhaust valve 22 change continuously. Note that the electric S-VT may be replaced with a hydraulic S-VT, as the exhaust valve operating mechanism.

The intake-side electric S-VT 23 and the exhaust-side electric S-VT 24 adjust length of an overlap period where both the intake valve 21 and the exhaust valve 22 open. If the length of the overlap period is made longer, the residual gas in the combustion chamber 17 can be purged. Moreover, by adjusting the length of the overlap period, internal EGR (Exhaust Gas Recirculation) gas can be introduced into the combustion chamber 17. An internal EGR system is comprised of the intake-side electric S-VT 23 and the exhaust-side electric S-VT 24. Note that the internal EGR system may not be comprised of the S-VT.

The injector 6 is attached to the cylinder head 13 for each cylinder 11. Each injector 6 directly injects fuel into the combustion chamber 17. The injector 6 is one example of a fuel injection part. The injector 6 is disposed in a valley part of the pent roof where the slope 1311 and the slope 1312 meet. As illustrated in FIG. 2, the injection axial center X2 of the injector 6 is located at the exhaust side of the center axis X1 of the cylinder 11. The injection axial center X2 of the injector 6 is parallel to the center axis X1. The injection axial center X2 of the injector 6 and the center of the cavity 31 are in agreement with each other. The injector 6 faces the cavity 31. Note that the injection axial center X2 of the injector 6 may be in agreement with the center axis X1 of the cylinder 11. In such a configuration, the injection axial center X2 of the injector 6 and the center of the cavity 31 may be in agreement with each other.

Although detailed illustration is omitted, the injector 6 is comprised of a multi nozzle-port type fuel injection valve having a plurality of nozzle ports. As illustrated by two-dot chain lines in FIG. 2, the injector 6 injects fuel so that the fuel spreads radially from the center of the combustion chamber 17. The injector 6 has ten nozzle ports in this example, and the nozzle port is disposed so as to be equally spaced in the circumferential direction.

The injectors 6 are connected to a fuel supply system 61. The fuel supply system 61 includes a fuel tank 63 configured to store fuel, and a fuel supply passage 62 which connects the fuel tank 63 to the injector 6. In the fuel supply passage 62, a fuel pump 65 and a common rail 64 are provided. The fuel pump 65 pumps fuel to the common rail 64. The fuel pump 65 is a plunger pump driven by the crankshaft 15 in this example. The common rail 64 stores fuel pumped from the fuel pump 65 at a high fuel pressure. When the injector 6 is opened, the fuel stored in the common rail 64 is injected into the combustion chamber 17 from the nozzle ports of the injector 6. The fuel supply system 61 can supply fuel to the injectors 6 at a high pressure of 30 MPa or higher. The pressure of fuel supplied to the injector 6 may be changed according to the operating state of the engine 1. Note that the configuration of the fuel supply system 61 is not limited to the configuration described above.

An ignition plug 25 is attached to the cylinder head 13 for each cylinder 11. The ignition plug 25 forcibly ignites a mixture gas inside the combustion chamber 17. The ignition plug 25 is disposed at the intake side of the center axis X1 of the cylinder 11 in this example. The ignition plug 25 is located between the two intake ports 181 and 182 of each cylinder. The ignition plug 25 is attached to the cylinder head 13 so as to incline downwardly toward the center of the combustion chamber 17. As illustrated in FIG. 2, the electrode of the ignition plug 25 faces to the inside of the combustion chamber 17 and is located near the ceiling surface of the combustion chamber 17. Note that the ignition plug 25 may be disposed at the exhaust side of the center axis X1 of the cylinder 11. Moreover, the ignition plug 25 may be disposed on the center axis X1 of the cylinder 11.

An intake passage 40 is connected to one side surface of the engine 1. The intake passage 40 communicates with the intake port 18 of each cylinder 11. Gas introduced into the combustion chamber 17 flows through the intake passage 40. An air cleaner 41 is disposed in an upstream end part of the intake passage 40. The air cleaner 41 filters fresh air. A surge tank 42 is disposed near the downstream end of the intake passage 40. A portion of the intake passage 40 downstream of the surge tank 42 constitutes independent passages branched from the intake passage 40 for each cylinder 11. The downstream end of each independent passage is connected to the intake port 18 of each cylinder 11.

A throttle valve 43 is disposed between the air cleaner 41 and the surge tank 42 in the intake passage 40. The throttle valve 43 adjusts an introducing amount of the fresh air into the combustion chamber 17 by adjusting an opening of the throttle valve. That is, the throttle valve 43 configures an "air adjusting part" which adjusts the air amount to be supplied into each combustion chamber 17 by increasing and decreasing the amount.

A supercharger 44 is also disposed in the intake passage 40, downstream of the throttle valve 43. The supercharger 44 boosts gas to be introduced into the combustion chamber 17. In this example, the supercharger 44 is a mechanical supercharger driven by the engine 1. The mechanical supercharger 44 may be a Roots, Lysholm, Vane, or a centrifugal type.

An electromagnetic clutch 45 is provided between the supercharger 44 and the engine 1. The electromagnetic clutch 45 transmits a driving force from the engine 1 to the supercharger 44 or disengages the transmission of the driving force between the supercharger 44 and the engine 1. As will be described later, an ECU 10 switches the disengagement and engagement of the electromagnetic clutch 45 to switch the supercharger 44 between ON and OFF.

An intercooler 46 is disposed downstream of the supercharger 44 in the intake passage 40. The intercooler 46 cools gas compressed by the supercharger 44. The intercooler 46 may be of a water cooling type or an oil cooling type, for example.

A bypass passage 47 is connected to the intake passage 40. The bypass passage 47 connects an upstream part of the supercharger 44 to a downstream part of the intercooler 46 in the intake passage 40 so as to bypass the supercharger 44 and the intercooler 46. An air bypass valve 48 is disposed in the bypass passage 47. The air bypass valve 48 adjusts a flow rate of gas flowing in the bypass passage 47.

The ECU 10 fully opens the air bypass valve 48 when the supercharger 44 is turned OFF (i.e., when the electromagnetic clutch 45 is disengaged). The gas flowing through the intake passage 40 bypasses the supercharger 44 and is introduced into the combustion chamber 17 of the engine 1. The engine 1 operates in a non-supercharged state, i.e., a natural aspiration state.

When the supercharger 44 is turned ON, the engine 1 operates in a supercharged state. The ECU 10 adjusts an opening of the air bypass valve 48 when the supercharger 44 is turned ON (i.e., when the electromagnetic clutch 45 is engaged). A portion of the gas which passed through the supercharger 44 flows back upstream of the supercharger 44 through the bypass passage 47. When the ECU 10 adjusts the opening of the air bypass valve 48, a supercharging pressure of gas introduced into the combustion chamber 17 changes. Note that the term "supercharging" as used herein refers to a situation where the pressure inside the surge tank 42 exceeds an atmospheric pressure, and "non-supercharging" refers to a situation where the pressure inside the surge tank 42 becomes below the atmospheric pressure.

In this example, a supercharging system 49 is comprised of the supercharger 44, the bypass passage 47, and the air bypass valve 48.

The engine 1 has a swirl generating part which generates a swirl flow inside the combustion chamber 17. As illustrated in FIG. 3, the swirl generating part has a swirl control valve 56 attached to the intake passage 40. Among a primary passage 401 coupled to the first intake port 181 and a secondary passage 402 coupled to the second intake port 182, the swirl control valve 56 is disposed in the secondary passage 402. The swirl control valve 56 is an opening control valve which is capable of choking a cross section of the secondary passage 402. When the opening of the swirl control valve 56 is small, since an intake flow rate of air flowing into the combustion chamber 17 from the first intake port 181 is relatively large, and an intake flow rate of air flowing into the combustion chamber 17 from the second intake port 182 is relatively small, the swirl flow inside the combustion chamber 17 becomes stronger. On the other hand, when the opening of the swirl control valve 56 is large, since the intake flow rates of air flowing into the combustion chamber 17 from the first intake port 181 and the second intake port 182 become substantially equal, the swirl flow inside the combustion chamber 17 becomes weaker. When the swirl control valve 56 is fully opened, the swirl flow will not occur. Note that the swirl flow circulates counterclockwise in FIG. 3, as illustrated by white arrows (also see white arrows in FIG. 2).

An exhaust passage 50 is connected to the other side surface of the engine 1. The exhaust passage 50 communicates with the exhaust port 19 of each cylinder 11. The exhaust passage 50 is a passage through which exhaust gas discharged from the combustion chambers 17 flows. Although detailed illustration is omitted, an upstream portion of the exhaust passage 50 constitutes independent passages branched from the exhaust passage 50 for each cylinder 11. The upper end of the independent passage is connected to the exhaust port 19 of each cylinder 11.

An exhaust gas purification system having a plurality of catalytic converters is disposed in the exhaust passage 50. Although illustration is omitted, an upstream catalytic converter is disposed inside an engine bay. The upstream catalytic converter has a three-way catalyst 511 and a GPF (Gasoline Particulate Filter) 512. The downstream catalytic converter is disposed outside the engine bay. The downstream catalytic converter has a three-way catalyst 513. Note that the exhaust gas purification system is not limited to the illustrated configuration. For example, the GPF may be omitted. Moreover, the catalytic converter is not limited to those having the three-way catalyst. Further, the order of the three-way catalyst and the GPF may suitably be changed.

Between the intake passage 40 and the exhaust passage 50, an EGR passage 52 which constitutes an external EGR system is connected. The EGR passage 52 is a passage for recirculating a portion of the exhaust gas to the intake passage 40. The upstream end of the EGR passage 52 is connected between the upstream catalytic converter and the downstream catalytic converter in the exhaust passage 50. The downstream end of the EGR passage 52 is connected to an upstream part of the supercharger 44 in the intake passage 40. EGR gas flowing through the EGR passage 52 flows into the upstream part of the supercharger 44 in the intake passage 40, without passing through the air bypass valve 48 of the bypass passage 47.

An EGR cooler 53 of water cooling type is disposed in the EGR passage 52. The EGR cooler 53 cools the exhaust gas. An EGR valve 54 is also disposed in the EGR passage 52. The EGR valve 54 adjusts a flow rate of the exhaust gas flowing through the EGR passage 52. By adjusting the opening of the EGR valve 54, an amount of the cooled exhaust gas, i.e., a recirculating amount of external EGR gas can be adjusted.

In this example, an EGR system 55 is comprised of the external EGR system and the internal EGR system. The external EGR system can supply the lower-temperature exhaust gas to the combustion chamber 17 than the internal EGR system.

In FIGS. 1 and 4, an alternator 57 is connected with the crankshaft 15. The alternator 57 is driven by the engine 1. An ECU 10 (described later) can adjust the torque outputted from the engine 1 by increasing the load of the alternator 57.

The control device for the compression ignition engine includes the ECU (Engine Control Unit) 10 for operating the engine 1. The ECU 10 is a controller based on a known microcomputer, and as illustrated in FIG. 4, includes a processor such as a central processing unit (CPU) 101 which executes programs, a memory 102 which is comprised of, for example, RAM (Random Access Memory) and/or ROM (Read Only Memory) and stores the programs and data, and an input/output bus 103 through which an electrical signal is inputted and outputted. The ECU 10 is one example of the "control device."

As illustrated in FIGS. 1 and 4, various kinds of sensors SW1-SW17 are connected to the ECU 10. The sensors SW1-SW17 output signals to the ECU 10. The sensors include the following sensors:

Airflow sensor SW1: Disposed downstream of the air cleaner 41 in the intake passage 40, and measures a flow rate of fresh air flowing through the intake passage 40;

First intake-air temperature sensor SW2: Disposed downstream of the air cleaner 41 in the intake passage 40, and measures the temperature of fresh air flowing through the intake passage 40;

First pressure sensor SW3: Disposed downstream of the connected position of the EGR passage 52 in the intake passage 40 and upstream of the supercharger 44, and measures the pressure of gas flowing into the supercharger 44;

Second intake-air temperature sensor SW4: Disposed downstream of the supercharger 44 in the intake passage 40 and upstream of the connected position of the bypass passage 47, and measures the temperature of gas flowed out of the supercharger 44;

Second pressure sensor SW5: Attached to the surge tank 42, and measures the pressure of gas downstream of the supercharger 44;

Pressure sensors SW6: Attached to the cylinder head 13 corresponding to each cylinder 11, and measures the pressure inside each combustion chamber 17;

Exhaust temperature sensor SW7: Disposed in the exhaust passage 50, and measures the temperature of the exhaust gas discharged from the combustion chamber 17;

Linear $O_2$ sensor SW8: Disposed upstream of the upstream catalytic converter in the exhaust passage 50, and measures the oxygen concentration of the exhaust gas;

Lambda $O_2$ sensor SW9: Disposed downstream of the three-way catalyst 511 in the upstream catalytic converter, and measures the oxygen concentration of the exhaust gas;

Water temperature sensor SW10: Attached to the engine 1 and measures the temperature of coolant;

Crank angle sensor SW11: Attached to the engine 1 and measures the rotation angle of the crankshaft 15;

Accelerator opening sensor SW12: Attached to an accelerator pedal mechanism and measures the accelerator opening corresponding to an operating amount of the accelerator pedal;

Intake cam angle sensor SW13: Attached to the engine 1 and measures the rotation angle of an intake cam shaft;

Exhaust cam angle sensor SW14: Attached to the engine 1 and measures the rotation angle of an exhaust cam shaft;

EGR pressure difference sensor SW15: Disposed in the EGR passage 52 and measures a pressure difference between the upstream and the downstream of the EGR valve 54;

Fuel pressure sensor SW16: Attached to the common rail 64 of the fuel supply system 61, and measures the pressure of fuel supplied to the injector 6; and Third intake-air temperature sensor SW17: Attached to the surge tank 42, and measures the temperature of gas inside the surge tank 42, i.e., the temperature of intake air introduced into the combustion chamber 17.

Each of the sensors SW1-SW17 is one example of a measuring part which measures a parameter related to the operating of the engine 1.

The ECU 10 determines the operating state of the engine 1 based on the signals of the sensors SW1-SW17, and calculates a control amount of each device according to the control logic defined beforehand. The control logic is stored in the memory 102. The control logic includes calculating a target amount and/or the control amount by using a map stored in the memory 102.

The ECU 10 outputs electrical signals according to the calculated control amounts to the injectors 6, the ignition plugs 25, the intake-side electric S-VT 23, the exhaust-side electric S-VT 24, the fuel supply system 61, the throttle valve 43, the EGR valve 54, the electromagnetic clutch 45 of the supercharger 44, the air bypass valve 48, the swirl control valve 56, and the alternator 57.

For example, the ECU 10 sets a target torque of the engine 1 based on the signal of the accelerator opening sensor SW12 and the map, and determines a target supercharging pressure. The ECU 10 then performs a feedback control for adjusting the opening of the air bypass valve 48 based on the target supercharging pressure and the pressure difference before and after the supercharger 44 obtained from the signals of the first pressure sensor SW3 and the second pressure sensor SW5 so that the supercharging pressure becomes the target supercharging pressure.

Moreover, the ECU 10 sets a target EGR rate (i.e., the rate of EGR gas to entire gas inside the combustion chamber 17) based on the operating state of the engine 1 and the map. The ECU 10 then determines a target EGR gas amount based on the target EGR rate and an inhaled air amount based on the signal of the accelerator opening sensor SW12, and performs feedback control for adjusting the opening of the EGR valve 54 based on the pressure difference before and after the EGR valve 54 obtained from the signal of the EGR pressure difference sensor SW15 so that the external EGR gas amount introduced into the combustion chamber 17 becomes the target EGR gas amount.

Further, the ECU 10 performs an air-fuel ratio feedback control when a given control condition is satisfied. For example, the ECU 10 adjusts the fuel injection amount of the injector 6 based on the oxygen concentration of the exhaust gas which is measured by the linear O2 sensor SW8 and the lambda O2 sensor SW9 so that the air-fuel ratio of the mixture gas becomes a desired value.

Note that the details of other controls of the engine 1 executed by the ECU 10 will be described later.

(Concept of SPCCI Combustion)

The engine 1 performs combustion by compressed self-ignition under a given operating state, mainly to improve fuel consumption and emission performance. The combustion by self-ignition varies largely in the timing of the self-ignition, if the temperature inside the combustion chamber 17 before a compression starts is nonuniform. Thus, the engine 1 performs SPCCI combustion which is a combination of SI combustion and CI combustion.

SPCCI combustion is combustion in which the ignition plug 25 forcibly ignites the mixture gas inside the combustion chamber 17 so that the mixture gas carries out SI combustion by flame propagation, and the temperature inside the combustion chamber 17 increases by the heat generation of SI combustion and the pressure inside the combustion chamber 17 increases by the flame propagation so that unburnt mixture gas carries out CI combustion by self-ignition.

By adjusting the heat amount of SI combustion, the variation in the temperature inside the combustion chamber 17 before a compression starts can be absorbed. By the ECU 10 adjusting the ignition timing, the mixture gas can be self-ignited at a target timing.

Figure 5:
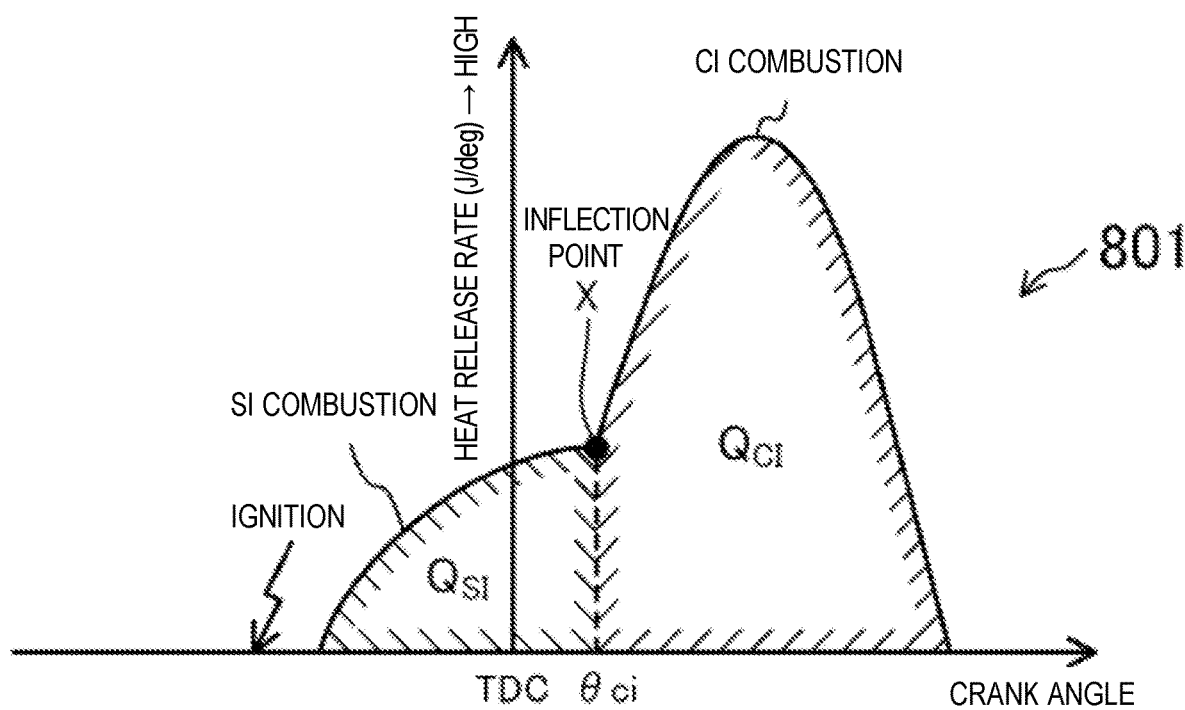
FIG. 5 is a graph illustrating a waveform of SPCCI combustion.

In SPCCI combustion, the heat release of SI combustion is slower than the heat release in CI combustion. As illustrated in FIG. 5, the waveform of the heat release rate of SI combustion in SPCCI combustion is smaller in the rising slope than the waveform in CI combustion. In addition, SI combustion is slower in the pressure fluctuation (dp/dθ) inside the combustion chamber 17 than CI combustion.

When the unburnt mixture gas self-ignites after SI combustion is started, the waveform slope of the heat release rate may become steeper. The waveform of the heat release rate may have an inflection point X at a timing of starting CI combustion (θci).

After the start in CI combustion, SI combustion and CI combustion are performed in parallel. Since CI combustion has a larger heat release than SI combustion, the heat release rate becomes relatively large. However, since CI combustion is performed after a compression top dead center, the waveform slope of the heat release rate does not become too steep. The pressure fluctuation in CI combustion (dp/dθ) also becomes comparatively slow.

The pressure fluctuation (dp/dθ) can be used as an index representing combustion noise. As described above, since SPCCI combustion can reduce the pressure fluctuation (dp/dθ), it is possible to avoid excessive combustion noise. Combustion noise of the engine 1 can be kept below a tolerable level.

SPCCI combustion is completed when CI combustion is finished. CI combustion is shorter in the combustion period than SI combustion. The end timing of SPCCI combustion becomes earlier than SI combustion.

The heat release rate waveform of SPCCI combustion is formed so that a first heat release rate waveform $Q_{SI}$ formed by SI combustion and a second heat release rate waveform $Q_{CI}$ formed by CI combustion continue in this order.

Here, a SI ratio is defined as a parameter indicative of a characteristic of SPCCI combustion. The SI ratio is defined as an index related to a ratio of an amount of heat generated by SI combustion to the entire amount of heat generated by SPCCI combustion. The SI ratio is a ratio of amount of heat generated by the two combustions of different combustion forms. When the SI ratio is high, the ratio of SI combustion is high, and on the other hand, when the SI ratio is low, the ratio of CI combustion is high. The SI ratio may be defined as a ratio of the amount of heat generated by SI combustion to the amount of heat generated by CI combustion. That is, if the crank angle at which CI combustion starts in SPCCI combustion is a CI combustion start timing θci, the SI ratio may be equal to $Q_{SI}/Q_{CI}$ (SI ratio=$Q_{SI}/Q_{CI}$) based on an area $Q_{SI}$ of SI combustion on advance side of θci and an area $Q_{CI}$ of CI combustion on retard side including θci, in the waveform 801 illustrated in FIG. 5.

The engine 1 may generate a strong swirl flow inside the combustion chamber 17, when performing SPCCI combustion. In more detail, the engine 1 generates the strong swirl flow inside the combustion chamber 17 when SPCCI combustion of mixture gas leaner than the stoichiometric air-fuel ratio is carried out. The "strong swirl flow" may be defined as a flow having a swirl ratio of, for example, 4:1 or higher. The swirl ratio can be defined as a value obtained by subtracting an integrated value of measurements of an intake air flow transverse angular velocity for every valve lift by an engine angular velocity. Although illustration is omitted, the intake air flow transverse angular velocity can be obtained based on measurements by using known rig test equipment.

When the strong swirl flow is generated inside the combustion chamber 17, the swirl flow is stronger in the outer circumferential part of the combustion chamber 17, while the swirl flow is relatively weaker in the central part. By the injector 6 injecting fuel into the combustion chamber 17 where the strong swirl flow is formed, the mixture gas can be stratified in which the mixture gas in the central part of the combustion chamber 17 is relatively dense, while the mixture gas in the outer circumferential part is relatively lean.

(Engine Operating Range)

Figure 6:
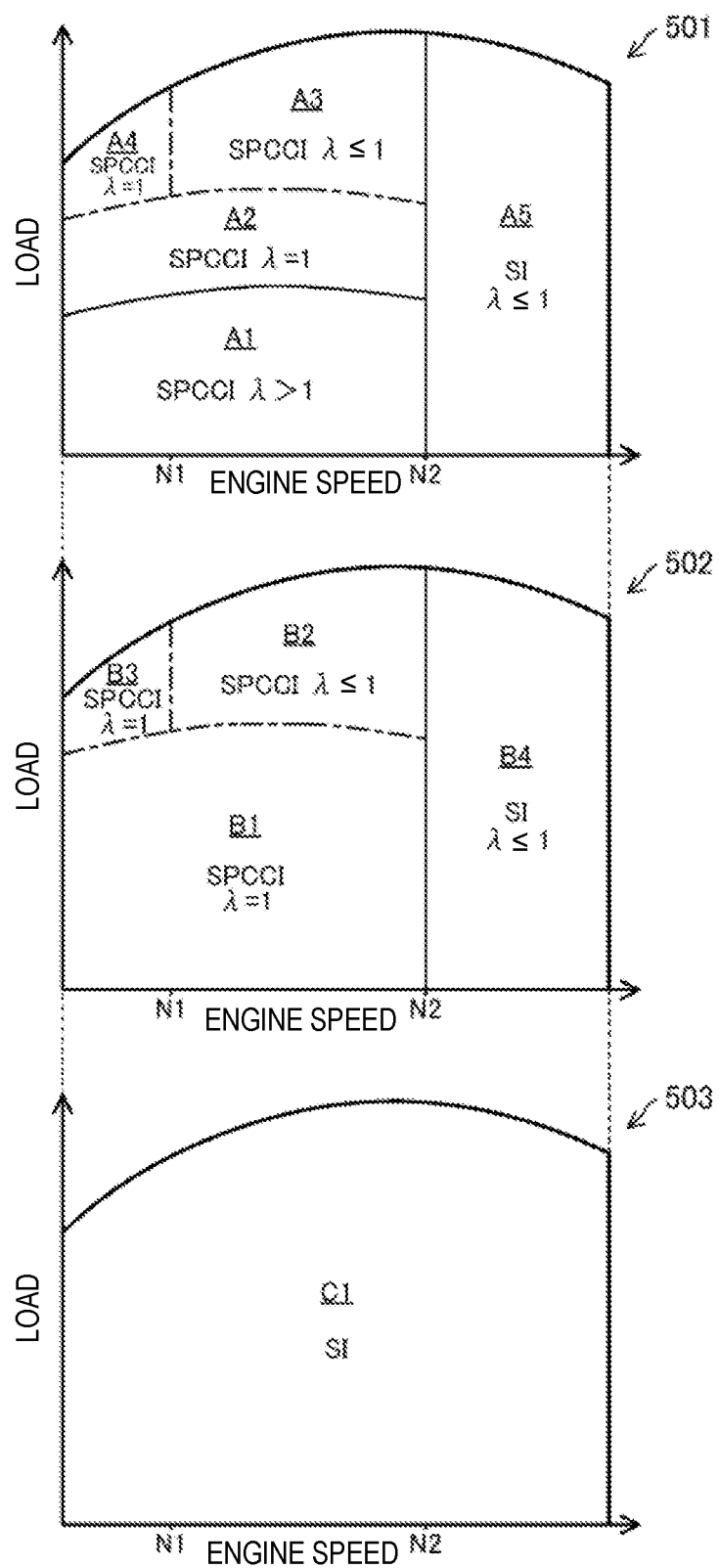
FIG. 6 is a view illustrating maps of the engine, where the top is a map when the engine is warm, the middle is a map when the engine is half-warm, and the bottom is a map when the engine is cold.
Figure 7:
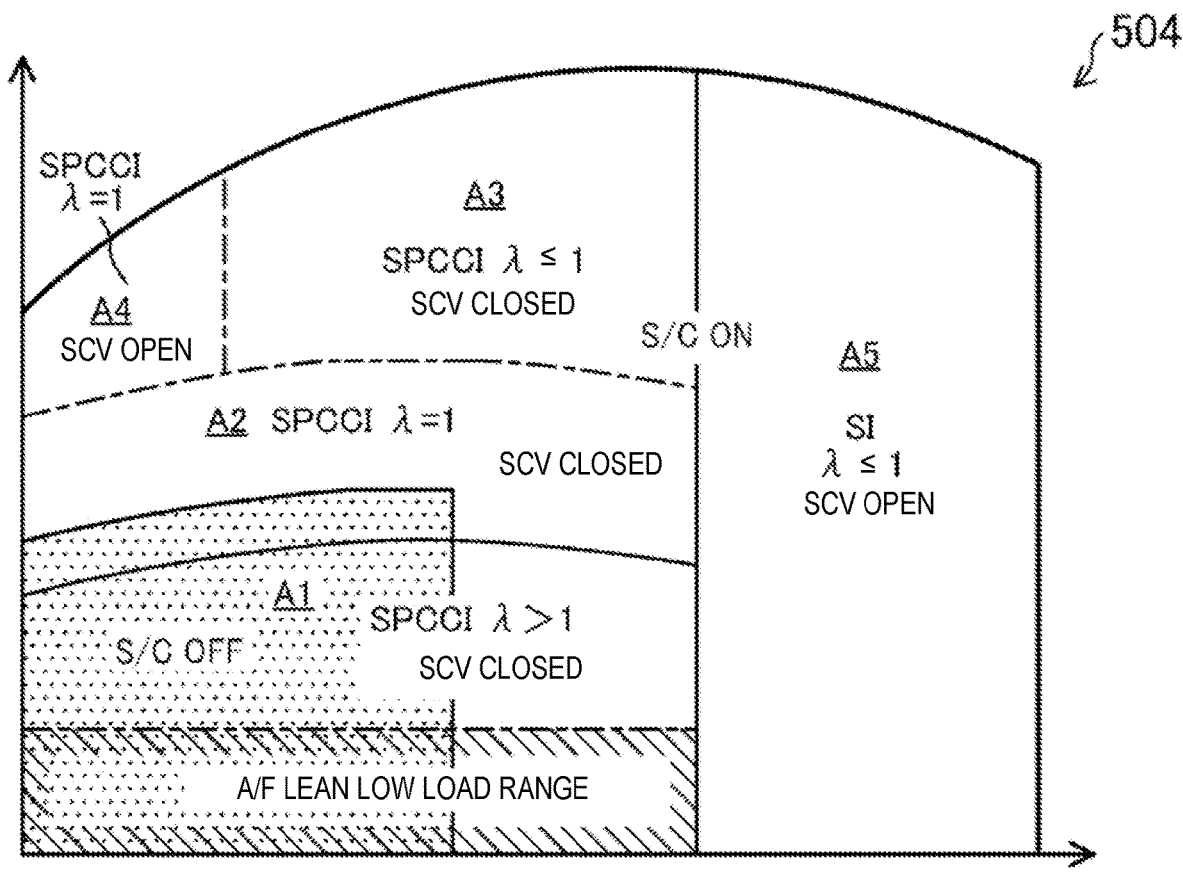
FIG. 7 is a view illustrating details of the map when the engine is warm.

FIGS. 6 and 7 illustrate maps according to the control of the engine 1. The maps are stored in the memory 102 of the ECU 10. The maps includes three kinds of maps: a map 501, a map 502, and a map 503. The ECU 10 uses one selected from the three kinds of maps 501, 502, and 503 for the control of the engine 1 according to a wall temperature of the combustion chamber 17 (or an engine water temperature), a temperature of intake air, and the atmospheric pressure. Note that the details of the selection of the three kinds of maps 501, 502, and 503 will be described later.

The first map 501 is a map when the engine 1 is warm. The second map 502 is a map when the engine 1 is half-warm. The third map 503 is a map when the engine 1 is cold.

The maps 501, 502, and 503 are defined by the load and the engine speed of the engine 1. The first map 501 is divided roughly into three areas according to the load and the engine speed. Concretely, the three areas are [1] a low load area A1 which includes idle operation and extends over a low speed range to a middle speed range, [2] middle-to-high load areas A2, A3, and A4 where the load is higher than the low load area A1, [3] a high speed area A5 where the engine speed is higher than the low load area A1, and the middle-to-high load areas A2, A3, and A4. The middle-to-high load areas A2, A3, and A4 are further divided into a middle load area A2, a high-load middle-speed area A3 where the load is higher than the middle load area A2, and a high-load low-speed area A4 where the engine speed is lower than the high-load middle-speed area A3.

The second map 502 is divided roughly into two areas. Concretely, the two areas are [1] low-and-middle speed areas B1, B2, and B3, and [2] a high speed area B4 where the engine speed is higher than the low-and-middle speed areas B1, B2, and B3. The low-and-middle speed area B1, B2, and B3 are further divided into a low-and-middle load area B1 equivalent to the low load area A1 and the middle load area A2, a high-load middle-speed area B2, and a high-load low-speed area B3.

The third map 503 is not divided into a plurality of areas, but has only one area C1.

Here, the low speed area, the middle speed area, and the high speed area may be defined by substantially equally dividing the entire operating range of the engine 1 into three areas in the engine speed direction. In the example of FIG. 6, the engine speed is defined to be a low speed if the engine speed is lower than the engine speed N1, a high speed if the engine speed is higher than or equal to the engine speed N2, and a middle speed if the engine speed is higher than or equal to the engine speed N1 and lower than the engine speed N2. For example, the engine speed N1 may be about 1,200 rpm, and the engine speed N2 may be about 4,000 rpm.

Moreover, the low load area may be an area including an operating state with the light load, the high load area may be an area including an operating state with full load, and the middle load area may be an area between the low load area and the high load area. Moreover, the low load area, the middle load area, and the high load area may be defined by substantially equally dividing the entire operating range of the engine 1 into three areas in the load direction.

The maps 501, 502, and 503 of FIG. 6 illustrate states of the mixture gas and combustion modes in the respective ranges. The map 504 of FIG. 7 corresponds to the first map 501, and illustrates states of the mixture gas and combustion modes in the respective ranges in this map, the opening of the swirl control valve 56 in the respective ranges, driving/non-driving ranges of the supercharger 44, and a range where the reduced-cylinder operation is performed (A/F lean low load range). The engine 1 performs SPCCI combustion in the low load area A1, the middle load area A2, the high-load middle-speed area A3, the high-load low-speed area A4, and the low-and-middle load area B1, the high-load middle-speed area B2, and the high-load low-speed area B3. The engine 1 performs SI combustion in other ranges, such as the high speed area A5, the high speed area B4, and the area C1.

(Operation of Engine in Each Area)

Below, the operation of the engine 1 in each area of the map 504 of FIG. 7 is described in detail.

(Low Load Area)

The engine 1 performs SPCCI combustion when the engine 1 operates in the low load area A1.

In order to improve the fuel efficiency of the engine 1, the EGR system 55 introduces the EGR gas into the combustion chamber 17. For example, the intake-side electric S-VT 23 and the exhaust-side electric S-VT 24 are provided with a positive overlap period where both the intake valve 21 and the exhaust valve 22 are opened near an exhaust top dead center. Part of the exhaust gas discharged from the combustion chamber 17 into the intake port 18 and the exhaust port 19 is re-introduced into the combustion chamber 17. Since the hot exhaust gas is introduced into the combustion chamber 17, the temperature inside the combustion chamber 17 increases. Thus, it becomes advantageous to stabilize SPCCI combustion. Note that the intake-side electric S-VT 23 and the exhaust-side electric S-VT 24 may be provided with a negative overlap period where both the intake valve 21 and the exhaust valve 22 are closed.

Moreover, the swirl generating part forms the strong swirl flow inside the combustion chamber 17. The swirl ratio is four or higher, for example. The swirl control valve 56 is fully closed or at a given opening (closed to some extent). As described above, since the intake port 18 is the tumble port, an inclined swirl flow having a tumble component and a swirl component is formed in the combustion chamber 17.

The injector 6 injects fuel into the combustion chamber 17 a plurality of times during the intake stroke. The mixture gas is stratified by the multiple fuel injections and the swirl flow inside the combustion chamber 17.

The fuel concentration of the mixture gas in the central part of the combustion chamber 17 is denser or richer than the fuel concentration in the outer circumferential part. For example, the air-fuel ratio (A/F) of the mixture gas in the central part is 20:1 or higher and 30:1 or lower, and the A/F of the mixture gas in the outer circumferential part is 35 or higher. Note that the value of the A/F is a value when the mixture gas is ignited, and the same applies to the following description. Since the A/F of the mixture gas near the ignition plug 25 is set 20:1 or higher and 30:1 or lower, generation of raw $NO_x$ during SI combustion can be reduced. Moreover, since the A/F of the mixture gas in the outer circumferential part is set to 35 or higher, CI combustion stabilizes.

The A/F of the mixture gas is leaner than a stoichiometric air-fuel ratio throughout the combustion chamber 17 (i.e., the excess air ratio $\lambda > 1$: "lean air-fuel ratio"). In more detail, the A/F of the mixture gas is 25:1 or higher and 31:1 or lower throughout the combustion chamber 17. Thus, the generation of raw $NO_x$ can be reduced and the exhaust emission performance can be improved.

After the fuel injection is finished, the ignition plug 25 ignites the mixture gas in the central part of the combustion chamber 17 at a given timing before a compression top dead center. The ignition timing may be during a final stage of the compression stroke. The compression stroke may be equally divided into three, an initial stage, a middle stage, and a final stage, and this final stage may be used as the final stage of the compression stroke described above.

As described above, since the mixture gas in the central part has the relatively high fuel concentration, the ignitability improves and SI combustion by flame propagation stabilizes. By SI combustion being stabilized, CI combustion begins at a suitable timing. Thus, the controllability in CI combustion improves in SPCCI combustion. Further, the generation of the combustion noise is reduced. Moreover, since the A/F of the mixture gas is made leaner than the stoichiometric air fuel ratio to perform SPCCI combustion, the fuel efficiency of the engine 1 can be significantly improved. Note that the low load area A1 corresponds to the Layer 3 described later. The layer 3 extends to the low load operating area and includes the minimum load operating state.

(Reduced-Cylinder Operation)

As illustrated in FIG. 7, in the low-load range A1 (the range of "Layer 3"), the reduced-cylinder operation is performed in the low-load range (A/F lean low-load range) where the load is the smallest. In other low-load ranges where the load is larger, the all-cylinder operation is normally performed. In the A/F lean low-load range, for example, if indicated as a Brake Mean Effective Pressure (BMEP), the pressure may be within a range below 200 kPa. Note that, BMEP does not express the load itself, but a value obtained by multiplying BMEP by the displacement is proportional to an axial torque.

Thus, in the operating range where BMEP is, for example, below 200 kPa, a throttle loss (pumping loss) of the engine 1 during combustion becomes relatively large. Therefore, in such an A/F lean low-load range, the reduced-cylinder operation (cylinder pause operation) in which SPCCI combustion is not performed in some of the plurality of combustion chambers 17 (in this embodiment, the combustion chambers 17 of two cylinders among the four cylinders) is performed.

In the all-cylinder operation, SPCCI combustion is performed in all the combustion chambers 17. On the other hand, in the reduced-cylinder operation, although SPCCI combustion is performed in some of the plurality of combustion chambers 17, SPCCI combustion is not performed by suspending the fuel injection (a so-called "fuel cutoff") in other combustion chambers 17.

In the reduced-cylinder operation, the intake valves 21 and the exhaust valves 22 are driven to perform the intake and exhaust processings in the combustion chambers 17 where SPCCI combustion is not performed, similar to the combustion chambers 17 where SPCCI combustion is performed. By performing such a reduced-cylinder operation, since the fuel amount relatively increases in the combustion chambers 17 where SPCCI combustion is performed, the throttle loss is reduced and the stable SPCCI combustion can be realized, even when the entire amount of fuel supplied according to the target torque is very little.

Note that the change processing between the reduced-cylinder operation and the all-cylinder operation will be described later.

(Middle-to-High Load Area)

When the engine 1 operates in the middle-to-high load area (A2, A3, and A4), the engine 1 also performs SPCCI combustion, similar to the low load area A1.

The EGR system 55 introduces the EGR gas into the combustion chamber 17. For example, the intake-side electric S-VT 23 and the exhaust-side electric S-VT 24 are provided with a positive overlap period where both the intake valve 21 and the exhaust valve 22 are opened near an exhaust top dead center. Internal EGR gas is introduced into the combustion chamber 17. Moreover, the EGR system 55 introduces the exhaust gas cooled by the EGR cooler 53 into the combustion chamber 17 through the EGR passage 52. That is, the external EGR gas with a lower temperature than the internal EGR gas is introduced into the combustion chamber 17. The external EGR gas adjusts the temperature inside the combustion chamber 17 to a suitable temperature. The EGR system 55 reduces the amount of the EGR gas as the engine load increases. The EGR system 55 may not recirculate the EGR gas containing the internal EGR gas and the external EGR gas during the full load.

Moreover, in the middle load area A2 and the high-load middle-speed area A3, the swirl control valve 56 is fully closed or at a given opening (closed to some extent). On the other hand, in the high-load low-speed area A4, the swirl control valve 56 is open.

The A/F of the mixture gas is a stoichiometric air-fuel ratio (A/F≈14.7:1) throughout the combustion chamber 17, or is substantially the stoichiometric air-fuel ratio. By the three-way catalysts 511 and 513 purifying the exhaust gas discharged from the combustion chamber 17, the exhaust emission performance of the engine 1 improves. The A/F of the mixture gas may be defined within purification windows of the three-way catalysts. The excess air ratio λ of the mixture gas may also be 1.0±0.2. Note that while the engine 1 operates in the high-load middle-speed range A3 including the full load (i.e., the maximum load), the A/F of the mixture gas may be the stoichiometric air-fuel ratio or richer than the stoichiometric air-fuel ratio throughout the combustion chamber 17 (i.e., the excess air ratio λ of the mixture gas is λ≤1).

Since the EGR gas is introduced into the combustion chamber 17, a gas-fuel ratio (G/F) which is a weight ratio of the entire gas to the fuel in the combustion chamber 17 becomes leaner than the stoichiometric air fuel ratio. The G/F of the mixture gas may be 18:1 or higher. Thus, a generation of a so-called "knock" is avoided. The G/F may be set 18:1 or higher and 30:1 or lower. Alternatively, G/F may be set 18:1 or higher and 50:1 or lower.

When the load of the engine 1 is the middle load, the injector 6 performs a plurality of fuel injections during an intake stroke. The injector 6 may perform the first injection in the first half of the intake stroke, and may perform the second injection in the second half of the intake stroke.

Moreover, when the load of the engine 1 is the high load, the injector 6 injects fuel in the intake stroke.

The ignition plug 25 ignites the mixture gas at a given timing near a compression top dead center after the fuel injection. When the load of the engine 1 is the middle load, the ignition plug 25 may ignite before the compression top dead center. When the load of the engine 1 is the high load, the ignition plug 25 may ignite after the compression top dead center.

By performing SPCCI combustion with A/F of the mixture gas being the stoichiometric air-fuel ratio, exhaust gas discharged from the combustion chamber 17 can be purified using the three-way catalysts 511 and 513. Moreover, by introducing EGR gas into the combustion chamber 17 to dilute the mixture gas, the fuel efficiency of the engine 1 improves. Note that the middle-to-high load areas A2, A3, and A4 correspond to Layer 2 described later. Layer 2 extends to the high load area and includes the maximum load operating state.

(Operation of Supercharger)

Here, as illustrated in the map 504 of FIG. 7, the supercharger 44 is OFF (refer to S/C OFF, the area with dots), in a part of the low load area A1 and a part of the middle load area A2. In detail, the supercharger 44 is OFF in a partial range of the low load area A1 on the low speed side. In a partial range of the low load area A1 on the high speed side, the supercharger 44 is ON in order to secure an intake air filling amount required corresponding to an increase in the engine speed. Moreover, the supercharger 44 is OFF in a partial range of the middle load area A2 on the low-load low-speed side. The supercharger 44 is ON in a partial range of the middle load area A2 on the high load side, in order to secure an intake air filling amount required corresponding to an increase in the fuel injection amount. Moreover, the supercharger 44 is ON also in a partial range of the middle load area A2 on the high speed side.

Note that the supercharger 44 is ON (refer to S/C ON) entirely in the high-load middle-speed area A3, the high-load low-speed area A4, and the high speed area A5.

(High-Speed Area)

As the engine speed increases, a time required for changing the crank angle by 1° becomes shorter. Thus, it becomes difficult to stratify the mixture gas inside the combustion chamber 17. As the engine speed increases, it becomes difficult to perform SPCCI combustion.

Thus, while the engine 1 is operating in the high-speed area A5, the engine 1 performs not SPCCI combustion but SI combustion. Note that the high-speed area A5 stretches entirely in the load direction from low load to high load.

The EGR system 55 introduces EGR gas into the combustion chamber 17. The EGR system 55 reduces an amount of EGR gas as the load increases. The EGR system 55 may make EGR gas zero when the engine is operating with full load.

The swirl control valve 56 is fully open. A swirl flow does not occur inside the combustion chamber 17, but only a tumble flow occurs. By fully opening the swirl control valve 56, it becomes possible to improve the filling efficiency and reduce a pumping loss.

Fundamentally, an air-fuel ratio (A/F) of mixture gas is a stoichiometric air-fuel ratio (A/F≈14.7:1) entirely in the combustion chamber 17. An excess air ratio λ of mixture gas may be set to 1.0±0.2. Note that while the engine 1 is operating with near the full load state, the excess air ratio λ of mixture gas may be less than one.

The injector 6 starts a fuel injection on intake stroke. The injector 6 injects fuel at once. By starting the fuel injection on intake stroke, homogeneous or substantially homogeneous mixture gas is formed inside the combustion chamber 17. Moreover, since a longer vaporizing time of the fuel can be secured, unburnt fuel loss can also be reduced.

The ignition plug 25 ignites the mixture gas at a suitable timing before a compression top dead center after the completion of the fuel injection.

(Layer Structure of Map)

Figure 8:
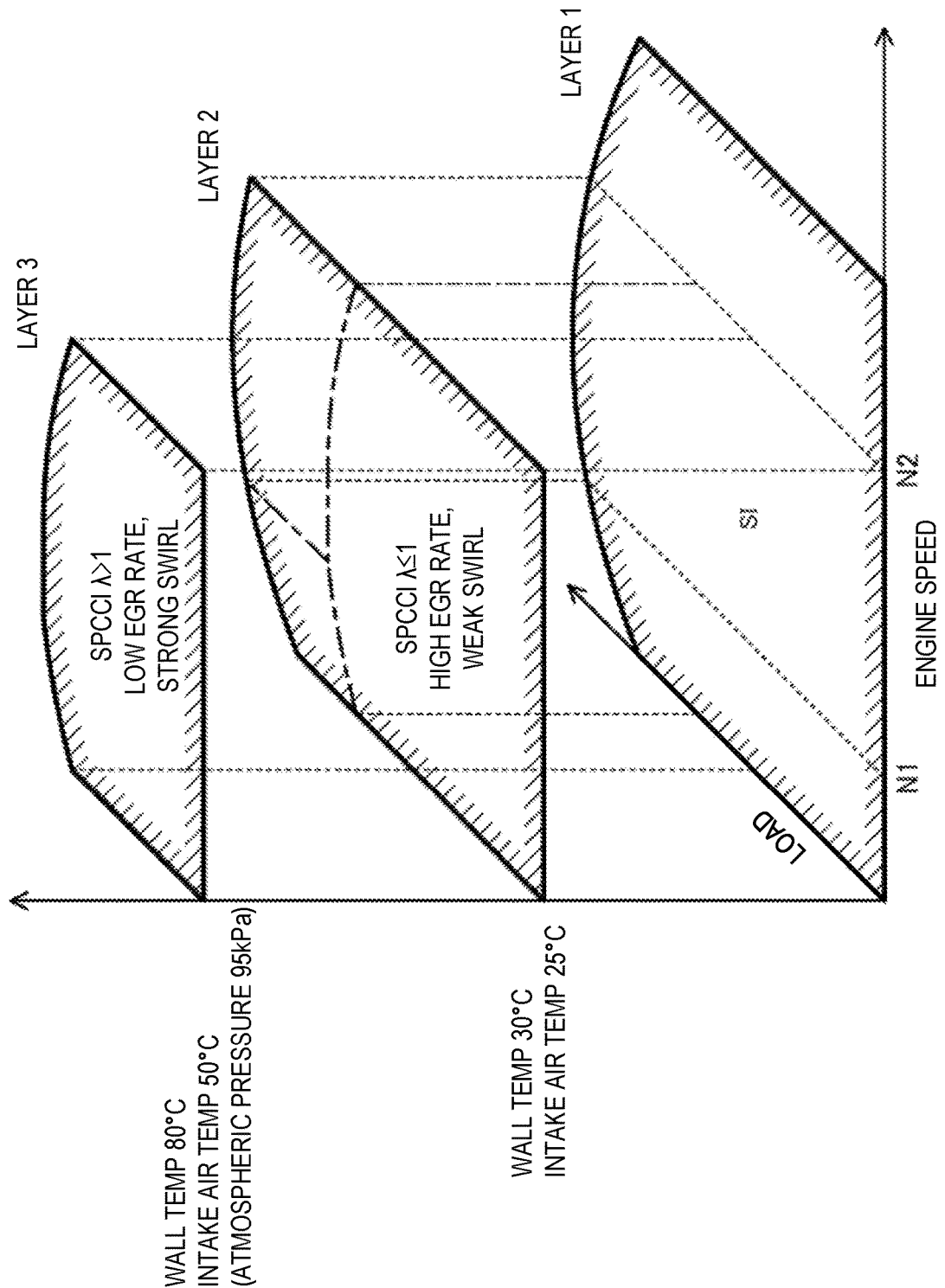
FIG. 8 is a view illustrating a layer structure of the maps of the engine.

The maps 501, 502, and 503 of the engine 1 illustrated in FIG. 6 are comprised of a combination of three layers: Layer 1, Layer 2, and Layer 3, as illustrated in FIG. 8.

Layer 1 is a base layer. Layer 1 extends entirely in the operating range of the engine 1. Layer 1 corresponds to the entire third map 503.

Layer 2 is a layer superimposed on Layer 1. Layer 2 corresponds to a part of the operating range of the engine 1. Concretely, Layer 2 corresponds to the low-and-middle speed areas B1, B2, and B3 of the second map 502.

Layer 3 is a layer superimposed on Layer 2. Layer 3 corresponds to the low load area A1 of the first map 501.

Layer 1, Layer 2, and Layer 3 are selected according to the wall temperature of the combustion chamber 17 (or the engine water temperature), the temperature of intake air, and the atmospheric pressure.

When the atmospheric pressure is higher than a given atmospheric-pressure threshold (e.g., 95 kPa), the wall temperature of the combustion chamber 17 is higher than a given first wall temperature (e.g., 80° C.), and the intake air temperature is higher than a given first intake air temperature (e.g., 50° C.), Layer 1, Layer 2, and Layer 3 are selected, and the first map 501 is formed by piling up these Layer 1, Layer 2, and Layer 3. In the low load area A1 in the first map 501, Layer 3 which is located at the top therein is enabled, in the middle-to-high load area A2, A3, and A4, Layer 2 which is located at the top therein is enabled, and in the high speed area A5, Layer 1 is enabled.

When the wall temperature of the combustion chamber 17 is below the given first wall temperature and higher than a given second wall temperature (e.g., 30° C.), and the intake air temperature is below the given first intake air temperature and higher than a given second intake air temperature (e.g., 25° C.), Layer 1 and Layer 2 are selected. The second map 502 is formed by piling up these Layer 1 and Layer 2. In the low-and-middle speed areas B1, B2, and B3 in the second map 502, Layer 2 which is located at the top therein is enabled, and in the high speed area B4, Layer 1 is enabled.

When the wall temperature of the combustion chamber 17 is below the given second wall temperature, and the intake air temperature is below a given second intake air temperature, only Layer 1 is selected and the third map 503 is formed by Layer 1.

Note that the wall temperature of the combustion chamber 17 may be substituted by, for example, the temperature of the cooling water of the engine 1 measured by the water temperature sensor SW10. Moreover, the wall temperature of the combustion chamber 17 may be estimated based on the temperature of cooling water, or other measurement signals. Moreover, the intake air temperature can be measured by, for example, the third intake air temperature sensor SW17 which measures the temperature inside the surge tank 42. Moreover, the intake air temperature introduced into the combustion chamber 17 may be estimated based on various kinds of measurement signals.

As described above, SPCCI combustion is performed by generating the strong swirl flow inside the combustion chamber 17. Since flame propagates along the wall of the combustion chamber 17 in SI combustion, the flame propagation of SI combustion is influenced by the wall temperature. If the wall temperature is low, the flame of SI combustion is cooled, thereby delaying the timing of the compression ignition.

Since CI combustion in SPCCI combustion is performed in an area from the outer circumferential part to the central part of the combustion chamber 17, it is influenced by the temperature of the central part of the combustion chamber 17. CI combustion becomes unstable if the temperature of the central part is low. The temperature of the central part of the combustion chamber 17 depends on the temperature of the intake air introduced into the combustion chamber 17. That is, the temperature of the central part of the combustion chamber 17 increases as the intake air temperature becomes higher, and decreases as the intake air temperature becomes lower.

When the wall temperature of the combustion chamber 17 is below the given second wall temperature, and the intake air temperature is below the given second intake air temperature, the stable SPCCI combustion cannot be performed. Therefore, only Layer 1 which performs SI combustion is selected, and the ECU 10 operates the engine 1 based on the third map 503. By the engine 1 performing SI combustion in all the operating ranges, the combustion stability can be secured.

When the wall temperature of the combustion chamber 17 is higher than the given second wall temperature and the intake air temperature is higher than the given second intake air temperature, SPCCI combustion of the mixture gas at the substantially stoichiometric air-fuel ratio (i.e., $\lambda \approx 1$) can be stably carried out. Therefore, in addition to Layer 1, Layer 2 is selected, and the ECU 10 operates the engine 1 based on the second map 502. By the engine 1 performing SPCCI combustion in the part of the operating range, the fuel efficiency of the engine 1 improves.

When the wall temperature of the combustion chamber 17 is higher than the given first wall temperature and the intake air temperature is higher than the given first intake air temperature, SPCCI combustion of the mixture gas leaner than the stoichiometric air-fuel ratio can be stably carried out. Therefore, in addition to Layer 1 and Layer 2, Layer 3 is selected, and the ECU 10 operates the engine 1 based on the first map 501. By the engine 1 carrying out SPCCI combustion of the lean mixture gas in the part of the operating range, the fuel efficiency of the engine 1 further improves.

However, if the atmospheric pressure is low, the amount of air filled up in the combustion chamber 17 decreases. Therefore, it becomes difficult to make the mixture gas to the given lean air-fuel ratio. Thus, Layer 3 is selected when the atmospheric pressure is higher than the given atmospheric-pressure threshold.

(Control of Layer Selection)

Figure 9:
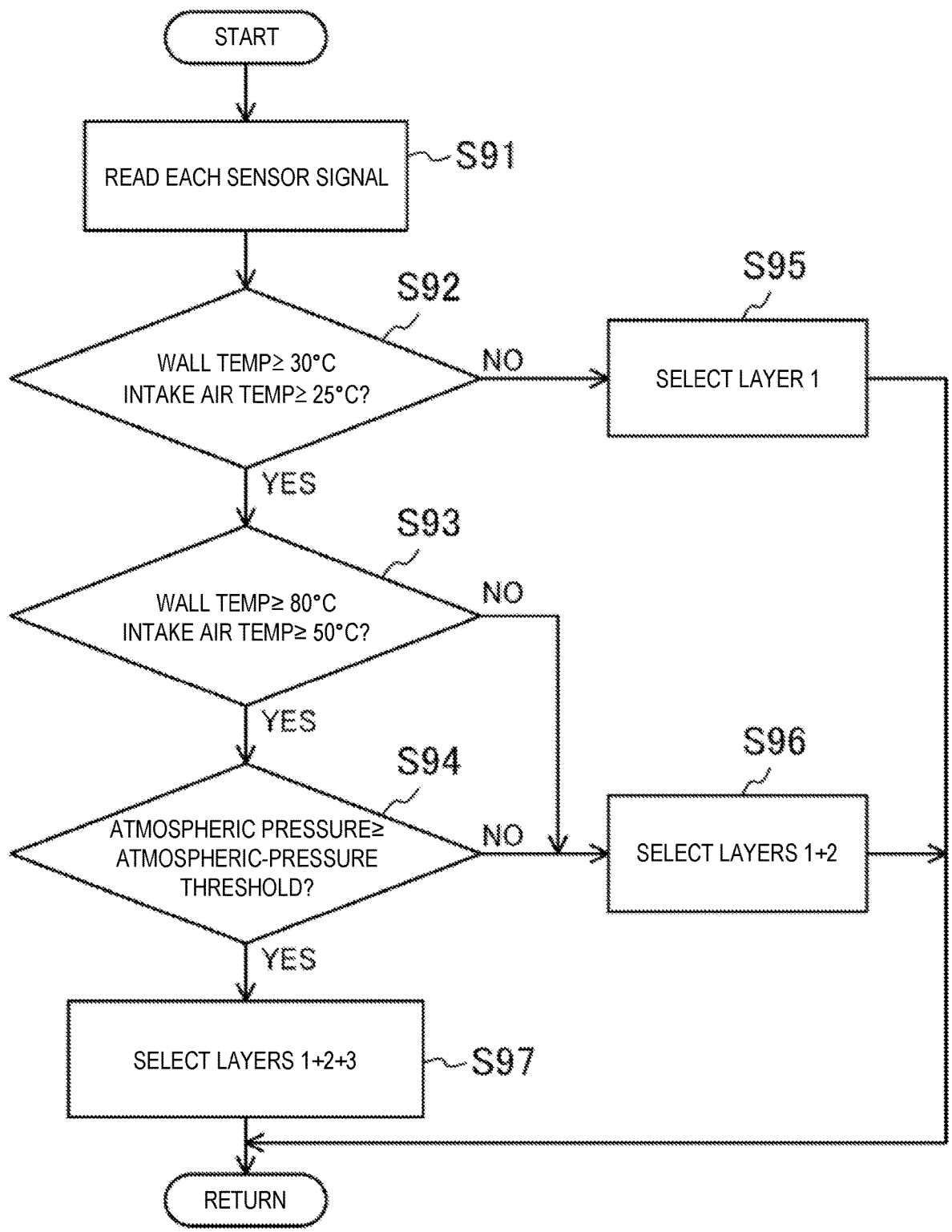
FIG. 9 is a flowchart illustrating a control process according to a layer selection of the maps.

Next, one example of a control related to the layer selection of the map executed by the ECU 10 is described with reference to a flowchart of FIG. 9. At Step S91 after a start, the ECU 10 first reads the signals of the sensors SW1-SW17. At the subsequent Step S92 the ECU 10 determines whether the wall temperature of the combustion chamber 17 is higher than 30° C., and the intake air temperature is higher than 25° C. If the determination at Step S92 is YES, the process shifts to Step S93, and on the other hand, if NO, the process shifts to Step S95. The ECU 10 selects only Layer 1 at Step S95. The ECU 10 operates the engine 1 based on the third map 503. The process then returns.

At Step S93 the ECU 10 determines whether the wall temperature of the combustion chamber 17 is higher than 80° C., and the intake air temperature is higher than 50° C. If the determination at Step S93 is YES, the process shifts to Step S94, and on the other hand, if NO, the process shifts to Step S96.

The ECU 10 selects Layer 1 and Layer 2 at Step S96. The ECU 10 operates the engine 1 based on the second map 502. The process then returns.

At Step S94, the ECU 10 determines whether the atmospheric pressure is higher than the atmospheric-pressure threshold. If the determination at Step S94 is YES, the process shifts to Step S97, and on the other hand, if NO, the process shifts to Step S96. At Step S96, the ECU 10 selects Layer 1 and Layer 2 as described above.

At Step S97, the ECU 10 selects Layer 1, Layer 2, and Layer 3. The ECU 10 operates the engine 1 based on the first map 501. The process then returns.

(Change Control of Cylinder Count)

Figure 10:
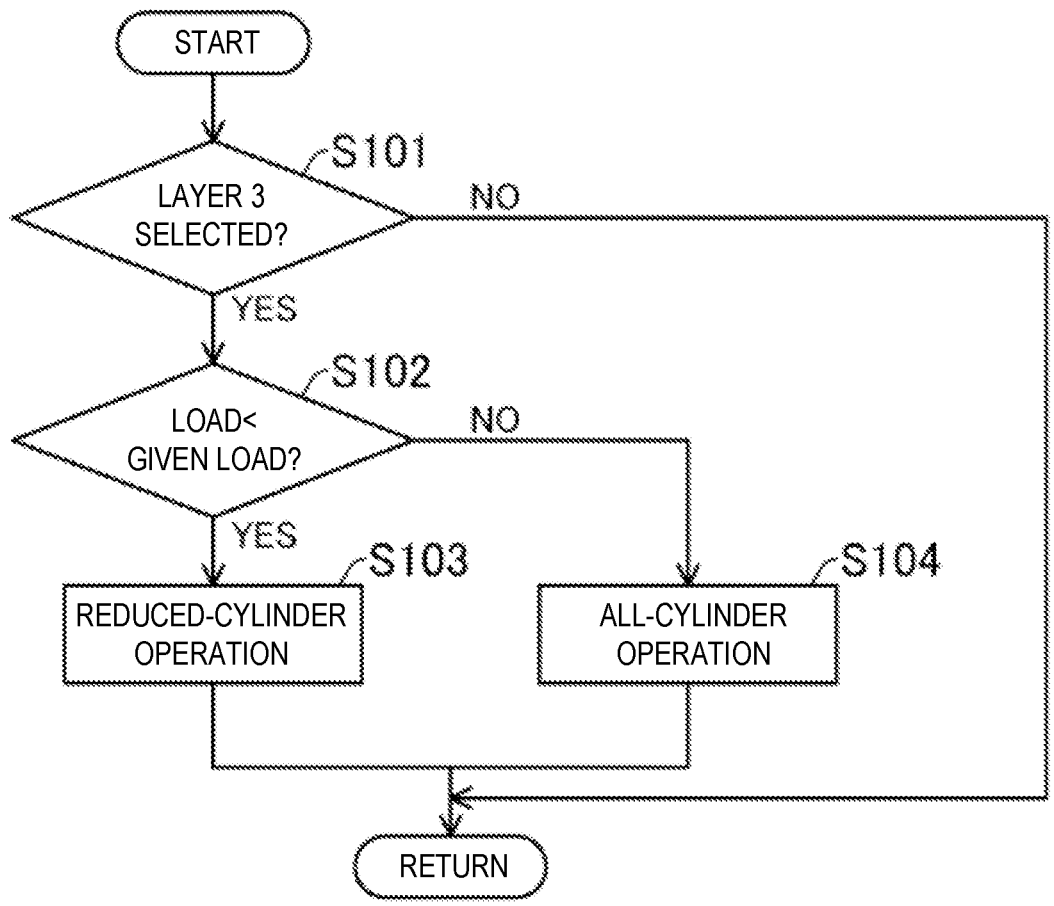
FIG. 10 is a flowchart illustrating a control process related to a change between a reduced-cylinder operation and an all-cylinder operation.

As described above, in this engine 1, the reduced-cylinder operation is performed in the A/F lean low-load range of the low-load range A1 by stopping the fuel injection into some of the combustion chambers 17 (fuel cutoff). Therefore, in the low-load range A1, a processing to change the operating state between the all-cylinder operation and the reduced-cylinder operation is performed. Next, a control for changing the number of cylinders is described with reference to a flowchart of FIG. 10.

The ECU 10 first determines whether the engine 1 is operated in the low-load range A1. That is, the ECU 10 determines whether Layer 3 is selected in the selection control of the layer described previously, in other words, whether the engine 1 is operated in the low-load range A1 of the first map 501 (Step S101). If Layer 3 is selected, the ECU 10 determines whether the engine load is smaller than a given load, for example, whether BMEP is lower than 200 kPa (Step S102).

As a result, if the engine load is smaller than the given load, the ECU 10 further determines that the operating range of the engine 1 is the A/F lean low-load range (refer to FIG. 7), and it performs the reduced-cylinder operation (Step S103). On the other hand, if the engine load is larger than the given load, the ECU 10 determines that the operating range of the engine 1 is not the A/F lean low-load range, and it performs the all-cylinder operation (Step S104).

(Problems in Change Between all-Cylinder Operation and Reduced-Cylinder Operation)

When the change control is performed, the total amount of fuel supplied to the engine 1 is held at substantially constant so that a large torque fluctuation (torque shock) does not occur.

In such a case, since the air amount and the fuel amount in the combustion chambers 17 where combustion is performed differ greatly between the reduced-cylinder operation and the all-cylinder operation, there is a problem such that raw $NO_x$ occurs or the combustion becomes unstable when changing the operation while maintaining the operating state of SPCCI combustion.

For example, when changing from the all-cylinder operation with four cylinders to the reduced-cylinder operation with two cylinders, it is necessary to inject twice the amount of fuel into each combustion chamber 17 where combustion is performed in the reduced-cylinder operation in order to keep the fuel amount supplied to the engine 1 constant. On the other hand, in order to maintain the lean air-fuel ratio, it is necessary to supply twice the amount of air.

Since fuel is directly injected into the combustion chamber 17 by the injector 6, the time delay (time lag) is very small. On the other hand, since air is introduced into the combustion chamber 17 through the air intake passage 40 after the throttle valve 43 is actuated, the time lag occurs.

Therefore, if the operation is changed instantly, since twice the amount of fuel is injected in the state where the air amount has not been increased, the air-fuel ratio becomes small instantly.

Figure 11:
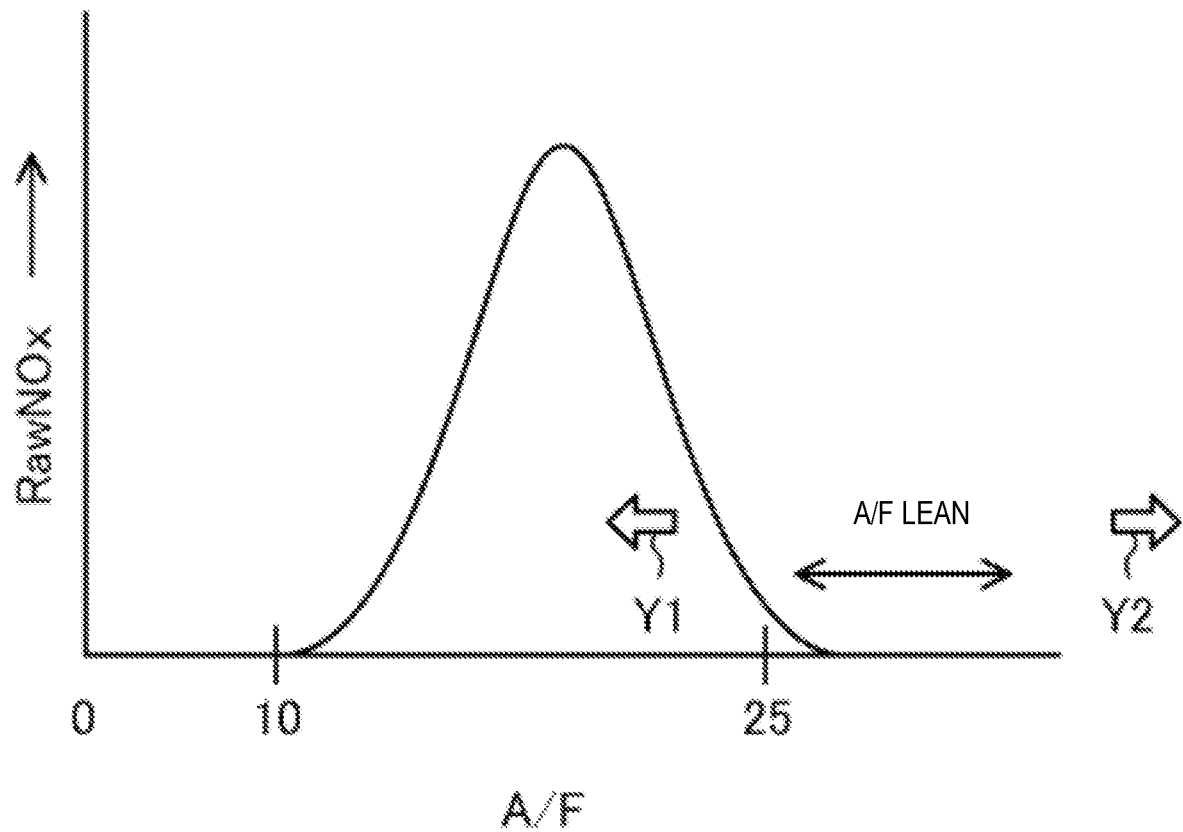
FIG. 11 is a graph illustrating a relation between a generated amount of raw $NO_x$ and A/F during combustion.

FIG. 11 illustrates a relation between the generated amount of raw $NO_x$ and A/F during combustion. As illustrated by a solid line of a mountain shape, raw $NO_x$ tends to be generated within a range where A/F is approximately 10 to 25, and has a peak at the median. In the low-load range A1 where the operation is changed, SPCCI combustion is performed while the air-fuel ratio is held within a range of substantially the lean air-fuel ratio (a range illustrated by an arrow "A/F lean"). If the air-fuel ratio is kept within the range, raw $NO_x$ will hardly be generated. Moreover, the stable SPCCI combustion can be realized.

However, as illustrated by an arrow Y1, if the air-fuel ratio becomes richer or lower at once from the state described above, raw $NO_x$ will occur and increase rapidly.

On the other hand, if the operation is changed after the increase in air, while maintaining the fuel amount, since the air-fuel ratio becomes further leaner and higher than the lean air-fuel ratio as illustrated by an arrow Y2. Therefore, since raw $NO_x$ is not generated but the air-fuel ratio becomes excessively lean, the stable SPCCI combustion becomes difficult.

On the contrary, when changing from the reduced-cylinder operation to the all-cylinder operation, the number of combustion chambers 17 where combustion is performed are doubled. In order to keep the fuel amount supplied to the engine 1 constant, it is necessary to reduce the fuel injection amount to half and to also reduce the air amount to half, in the combustion chambers 17 where combustion is performed.

Therefore, in this case, if the operation is changed instantly, since the fuel is halved without the air amount being reduced, the air-fuel ratio becomes high at once. Therefore, although raw $NO_x$ is not generated, the stable SPCCI combustion becomes difficult because the air-fuel ratio became excessively lean.

On the other hand if the operation is changed after the reduction in air while maintaining the fuel amount, raw $NO_x$ occurs, as illustrated by the arrow Y1, because the air-fuel ratio becomes lower.

Therefore, this engine 1 is devised such that, as will be described later, the ECU 10 is provided with a cylinder count control module 10a, and when the operating state is changed between the all-cylinder operation and the reduced-cylinder operation, the operating state is changed smoothly while preventing the degradation of the emission performance.

(Basic Control of Engine)

Figure 12:
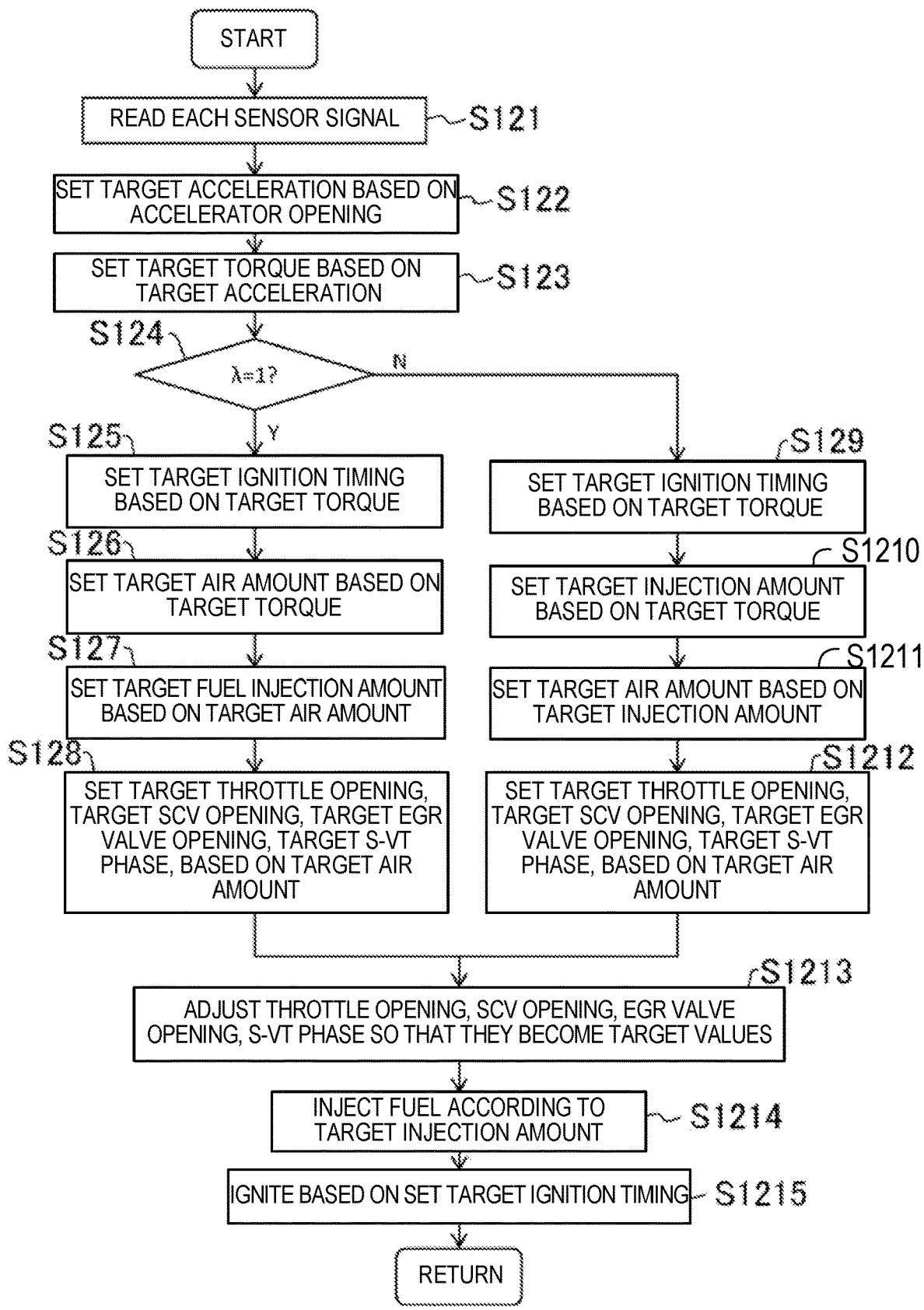
FIG. 12 is a flowchart illustrating a basic control of the engine.

FIG. 12 illustrates a flowchart of a basic control of the engine 1 executed by the ECU 10. The ECU 10 operates the engine 1 according to the control logic stored in the memory 102. Concretely, the ECU 10 determines the operating state of the engine 1 based on the signals of the sensors SW1-SW17, sets the target torque, and calculates for adjustments of the properties inside the combustion chamber 17, the injection amount, the injection timing, and the ignition timing so that the engine 1 outputs the target torque.

The ECU 10 controls SPCCI combustion using two parameters of a SI ratio and θci, when performing SPCCI combustion. Concretely, the ECU 10 defines a target SI ratio and a target θci corresponding to the operating state of the engine 1, and adjusts the temperature inside the combustion chamber 17 and the ignition timing so that an actual SI ratio become in agreement with the target SI ratio, and an actual θci becomes in agreement with the target θci. The ECU 10 sets the target SI ratio low when the load of the engine 1 is low, and sets the target SI ratio high when the load of the engine 1 is high. When the load of the engine 1 is low, both the reduction of combustion noise and the improvement of fuel efficiency are achieved by increasing the ratio of CI combustion in SPCCI combustion. When the load of the engine 1 is high, it becomes advantageous in reducing the combustion noise by raising the ratio of SI combustion in SPCCI combustion.

At Step S121 in the flowchart of FIG. 12, the ECU 10 reads the signals of the sensors SW1-SW17, and at the subsequent Step S122, the ECU 10 sets a target acceleration based on the accelerator opening. At Step S123, the ECU 10 sets a target torque required for realizing the target acceleration setting.

At Step S124, the ECU 10 determines the operating state of the engine 1, and determines whether the air-fuel ratio of the mixture gas is the stoichiometric air-fuel ratio or the substantially stoichiometric air-fuel ratio (i.e., the excess air ratio $\lambda=1$). At Step S124, the ECU 10 determines whether the engine 1 operates in Layer 1 or Layer 2 ($\lambda=1$), or operates in Layer 3 ($\lambda \neq 1$). If $\lambda=1$, the process shifts to Step S125, and on the other hand, if $\lambda \neq 1$, the process shifts to Step S129.

Steps S125-S128 correspond to steps for setting a target control value of each device, when the engine 1 operates in Layer 1 or Layer 2. At Step S125, the ECU 10 sets a target ignition timing of the ignition plug 25 based on the target torque setting. At the subsequent Step S126, the ECU 10 sets a target amount of air filled up in the combustion chamber 17 based on the target torque setting. At Step S127, the ECU 10 sets a target fuel injection amount based on the target air amount setting so that the air-fuel ratio of the mixture gas becomes the stoichiometric air-fuel ratio or the substantially stoichiometric air-fuel ratio. Then, at Step S128, the ECU 10 sets a target throttle opening of the throttle valve 43, a target SCV opening of the swirl control valve 56, a target EGR valve opening of the EGR valve 54, a target S-VT phase of the intake electric S-VT23, and a target S-VT phase of the exhaust electric S-VT24, based on the target air amount setting.

Steps S129-S1212 correspond to steps for setting the target control value of each device, when the engine 1 operates in Layer 3. At Step S129, the ECU 10 sets the target ignition timing of the ignition plug 25 based on the target torque setting. At the subsequent Step S1210, the ECU 10 sets the target fuel injection amount based on the target torque setting. At Step S1211, the ECU 10 sets the target amount of air filled up in the combustion chamber 17 based on the target injection amount setting so that the air-fuel ratio of the mixture gas becomes the given lean air-fuel ratio. As described above, the air-fuel ratio of the mixture gas is within a range of 25:1 to 31:1. Then, at Step S1212, the ECU 10 sets the target throttle opening of the throttle valve 43, the target SCV opening of the swirl control valve 56, the target EGR valve opening of the EGR valve 54, the target S-VT phase of the intake-side electric S-VT23, and the target S-VT phase of the exhaust-side electric S-VT24, based on the target air amount setting.

At Step S1213, the ECU 10 adjusts the throttle opening of the throttle valve 43, the SCV opening of the swirl control valve 56, and the EGR valve opening of the EGR valve 54, the S-VT phase of the intake electric S-VT23, and the S-VT phase of the exhaust electric S-VT24 so that these parameters become target values set at Step S128 or Step S1212.

At Step S1214, the ECU 10 causes the injector 6 to inject fuel at a given timing according to the target injection amount setting, and at the subsequent Step S1215, the ECU 10 causes the ignition plug 25 to ignite at the set target ignition timing.

(Cylinder Count Control Module 10a)

Figure 13:
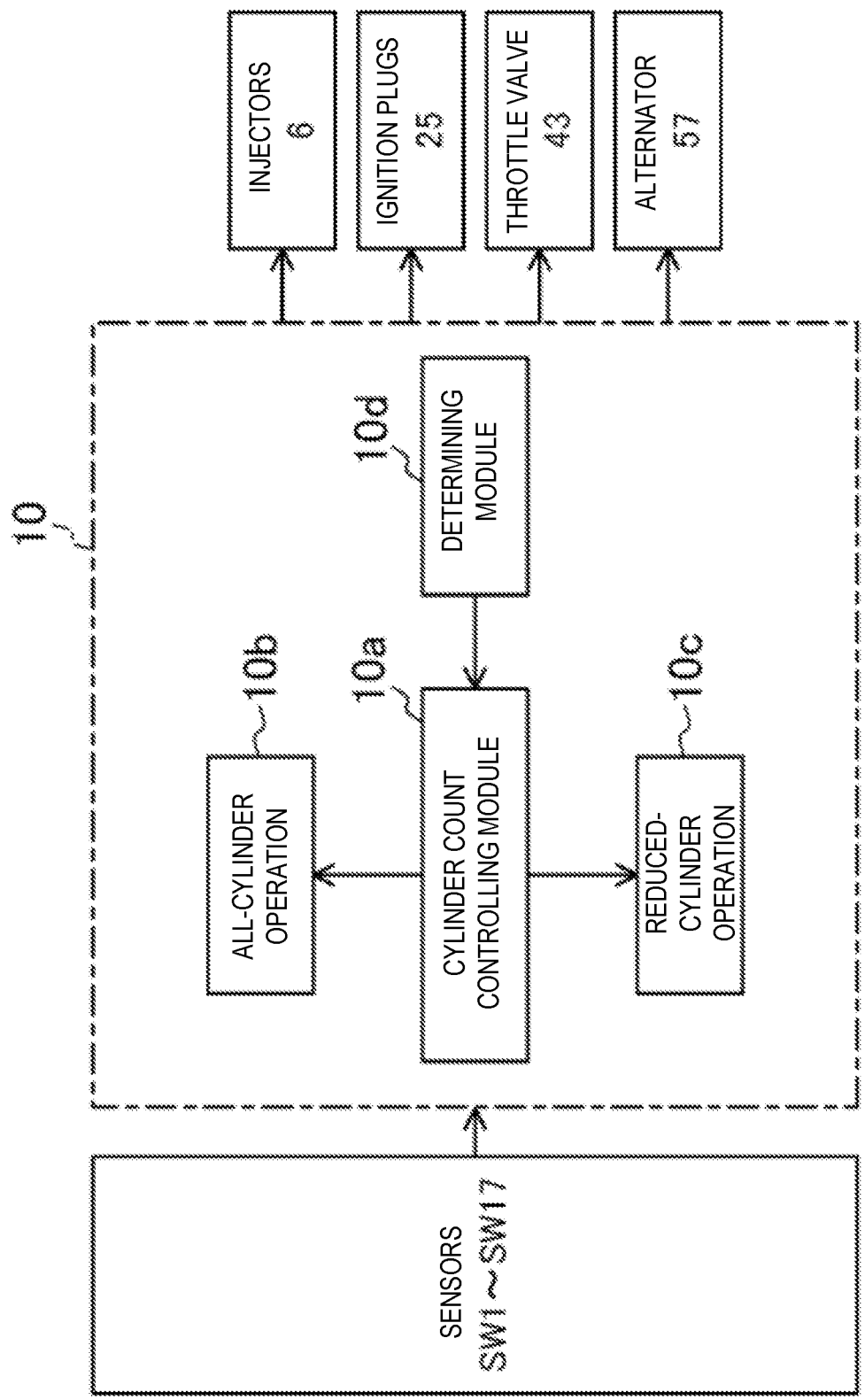
FIG. 13 is a block diagram illustrating a functional block of an ECU related to the change between the reduced-cylinder operation and the all-cylinder operation.

FIG. 13 illustrates a configuration of a functional block of the ECU 10 related to the change between the all-cylinder operation and the reduced-cylinder operation. The functional block includes the cylinder count control module 10a described above, an all-cylinder operation module 10b, a reduced-cylinder operation module 10c, and a determination module 10d.

When a change demand is received, the cylinder count control module 10a outputs signals to the injectors 6, the ignition plugs 25, the throttle valve 43, the alternator 57, etc. based on the signals of the sensors SW1-SW17, and executes a preparation control to change the operation between the all-cylinder operation and the reduced-cylinder operation. The all-cylinder operation module 10b performs SPCCI combustion in the combustion chambers of all the four cylinders within an operating range in the low-load range A1 where the load is larger than the given load. In the A/F lean low-load range of the low-load range A1, the reduced-cylinder operation module 10c suspends the fuel injection into the combustion chambers 17 of two cylinders among the four cylinders and does not perform SPCCI combustion in the two cylinders, but injects fuel into the combustion chambers 17 of other two cylinders and performs SPCCI combustion in the two cylinders.

The determination module 10d determines whether the change between the all-cylinder operation and the reduced-cylinder operation is necessary. If the change is necessary, the determination module 10d outputs the determination result to the cylinder count control module 10a to demand the change. The cylinder count control module 10a which received the change demand from the determination module 10d executes the preparation control according to the change demand.

(First Preparation Control Pattern: Change from all-Cylinder Operation to Reduced-Cylinder Operation)

Figure 14:
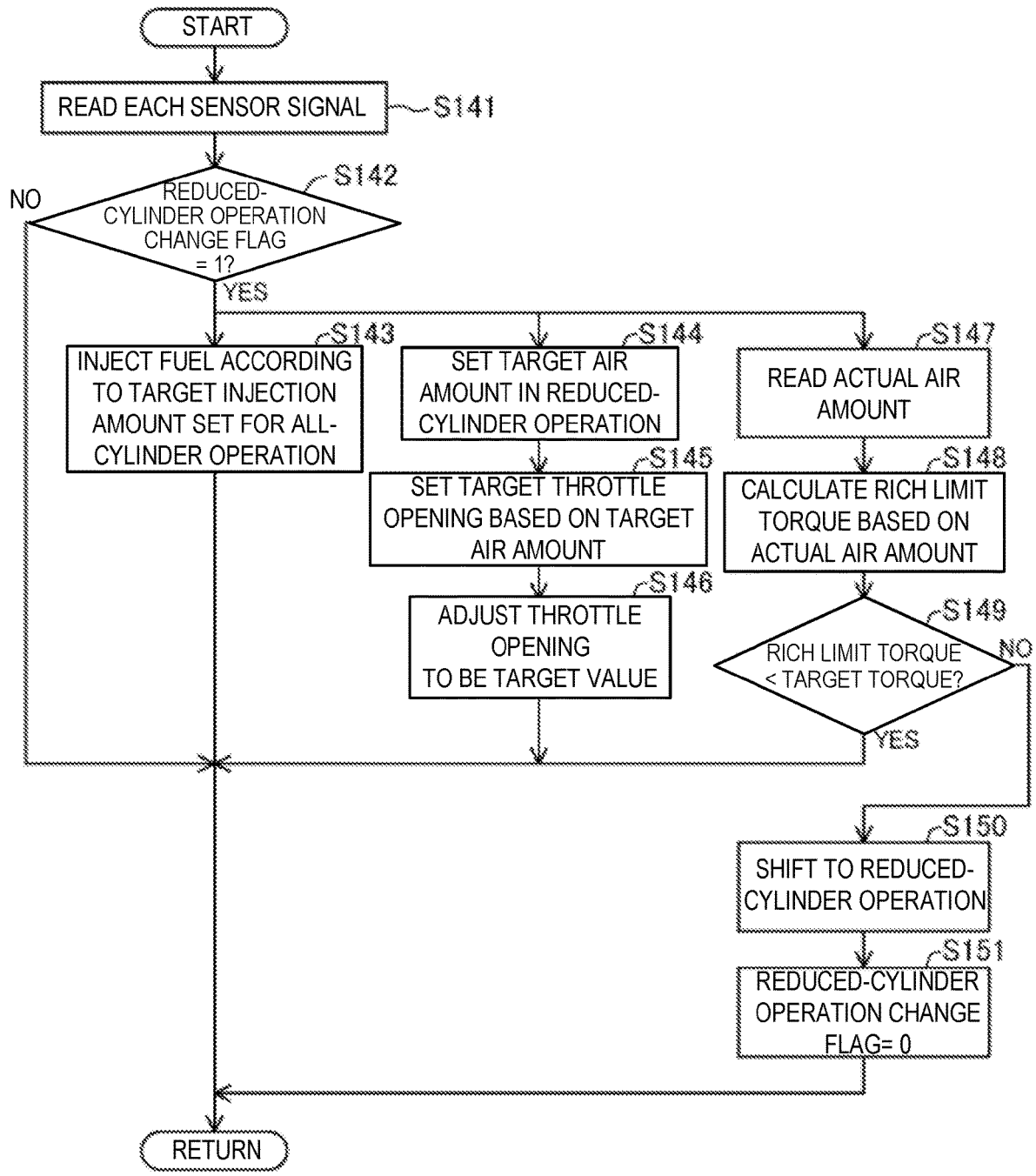
FIG. 14 is a flowchart illustrating a first preparation control pattern related to a change from the reduced-cylinder operation to the all-cylinder operation.

FIG. 14 illustrates one example of the preparation control for the change from the all-cylinder operation to the reduced-cylinder operation (a pattern of a first preparation control). The ECU 10 reads the signals of the sensors SW1-SW17 (Step S141). Next, the ECU 10 determines whether the change from the all-cylinder operation to the reduced-cylinder operation is necessary (Step S142).

Concretely, the determination module 10d of the ECU 10 determines whether the change from the all-cylinder operation to the reduced-cylinder operation is necessary based on the operating state of the engine 1. As a result of the determination, if the change is necessary, the determination module 10d sets a reduced-cylinder operation change flag to 1. The ECU 10 determines whether the reduced-cylinder operation change flag is 1. If the flag is 1, the process shifts to the step of the preparation control, and on the other hand, if the flag is not 1, the process returns without shifting to the process of the preparation control.

When the preparation control process is started concretely, the ECU 10 first maintains the amount of fuel injected into each combustion chamber 17 during the change (a fuel amount maintain processing). That is, the fuel is injected into all the combustion chambers 17 at the fuel amount according to the target injection amount set for the all-cylinder operation during the change (Step S143).

In the meantime, since the total amount of fuel used for the combustion of the engine 1 is constant, the torque outputted is held at substantially constant.

The ECU 10 sets a target air amount in the reduced-cylinder operation (Step S144). Further, the ECU 10 sets a target throttle valve opening based on the target air amount setting (Step S145). Then, the ECU 10 adjusts the opening of the throttle valve 43 so as to become the target throttle valve opening setting (Step S146).

Specifically, the ECU 10 outputs a signal to the throttle valve 43 to increase the amount of air supplied to each of the combustion chambers 17 (an air amount increase processing). When changing from the all-cylinder operation to the reduced-cylinder operation, the target air amount relatively increases and the opening of the throttle valve 43 changes from small to large. Here, the air amount filled up in the combustion chamber 17 does not increase instantly. Therefore, the time delay (time lag) occurs by the time the air amount reaches the target air amount.

The ECU 10 reads an amount of air actually filled up in the combustion chamber 17 (Step S147). Next, the ECU 10 calculates a rich limit torque based on the read actual air amount (Step S148).

(Rich Limit Torque, Retard Limit Torque)

Although the engine is operated in the low-load range A1 at the lean air-fuel ratio where raw $NO_x$ is hardly generated. The rich limit torque means a torque obtained from the engine 1 when SPCCI combustion is performed at an air-fuel ratio when the fuel amount is increased with respect to the actual air amount from the lean air-fuel ratio to such a limit below which raw $NO_x$ is not generated (a rich limit A/F corresponding to a threshold which will be described later).

In other words, the rich limit A/F (threshold) is an air-fuel ratio lower than the target lean air-fuel ratio of the low-load range A1, and if air-fuel ratio exceeds the threshold, there is a possibility that raw $NO_x$ occurs. The rich limit torque corresponds to an upper limit of the torque which can be generated under the condition in which the air-fuel ratio is made at such a rich limit A/F based on the actual air amount. The rich limit torque is an imaginary torque calculated by the ECU 10.

On the other hand, the retard limit torque (used in a second preparation control pattern which will be described later) is a torque of the engine 1 obtained by carrying out SPCCI combustion of the mixture gas at a lean air-fuel ratio in a state where the ignition timing is retarded as much as possible. If the ignition timing is excessively retarded, CI combustion in SPCCI combustion may not occur, or the stability of SI combustion may be reduced. The engine 1 which performs SPCCI combustion has a retard limit of the ignition timing. The retard limit torque corresponds to a lower limit of the torque of the engine 1 which can be reduced by retarding the ignition timing under a condition where the air-fuel ratio is made at the lean air-fuel ratio based on the actual air amount. The retard limit torque is also an imaginary torque calculated by the ECU 10.

Figure 15:
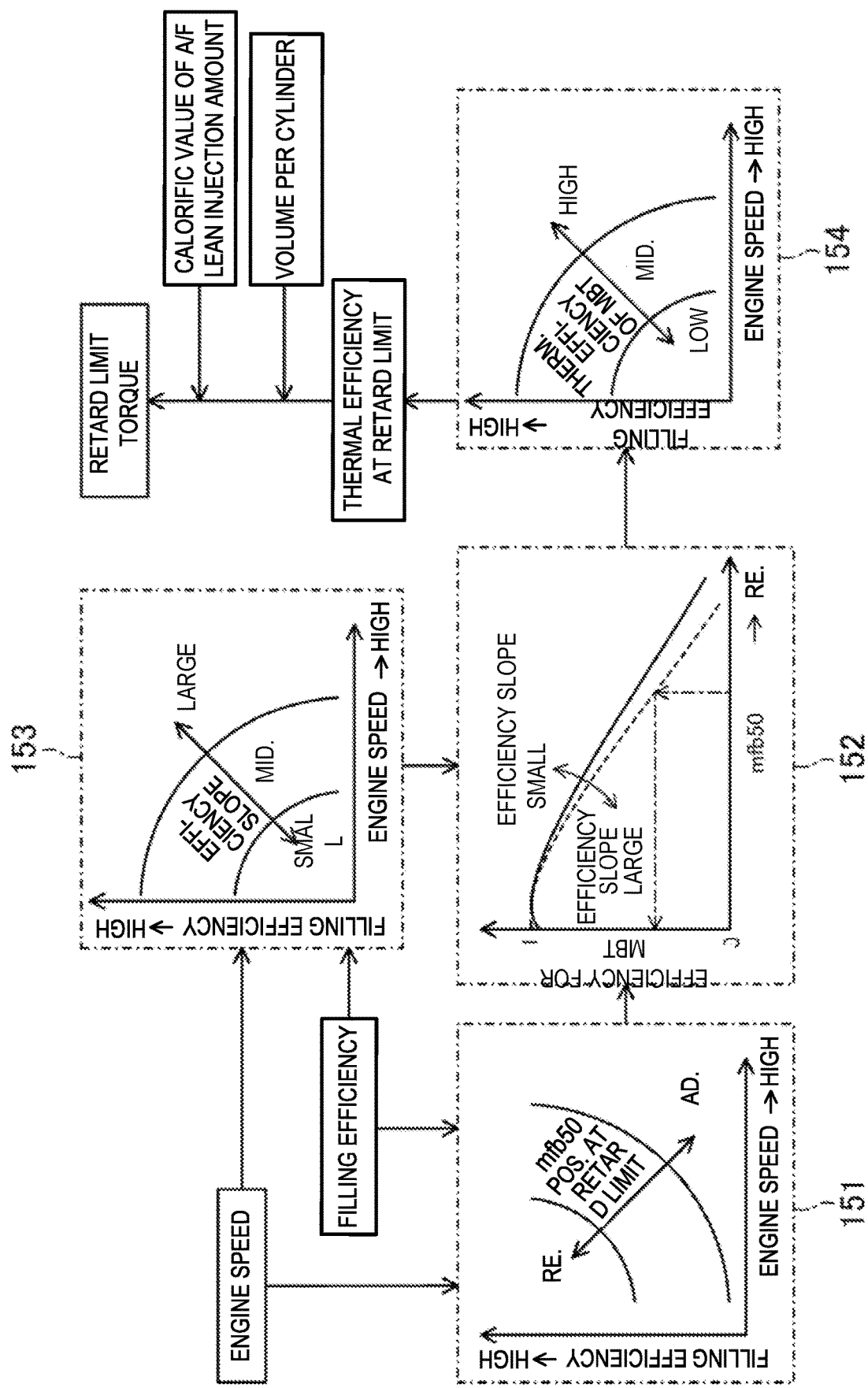
FIG. 15 is a view illustrating a calculation procedure at the retard limit torque.

FIG. 15 is a block diagram illustrating a calculation procedure of the retard limit torque. The ECU 10 calculates the retard limit torque based on the thermal efficiency of the engine 1 at the retard limit. The thermal efficiency of the engine 1 at the retard limit is calculated based on the thermal efficiency of the engine 1 at MBT (Minimum advance for Best Torque), and the mfb50 position at the retard limit. The mfb50 position at the retard limit is a crank angle at which a mass combustion rate (Mass Fraction Burnt: mfb) becomes 50% in a combustion waveform when the ignition timing is retarded as much as possible.

The ECU 10 calculates the mfb50 position at the retard limit based on the engine speed, the filling efficiency, a map 151 determined beforehand. The map 151 defines a relation between the engine operating state (the engine speed, and the filling efficiency, i.e., corresponding to the load of the engine 1), and the mfb50 position at the retard limit. As the engine speed decreases, and the load increases (i.e., the filling efficiency is high), the fuel amount increases and the combustion stability becomes higher, and since a time from an ignition to combustion becomes longer even if the ignition timing is retarded, a misfire etc. can be reduced. The ignition timing can be more retarded as the engine speed decreases and the load increases. The mfb50 position at the retard limit is retarded as the engine speed decreases and the load increases, and is advanced as the engine speed increases and the load decreases (i.e., the filling efficiency is low).

Note that, although the mfb50 position at the retard limit is determined using the map 151, the mfb50 position at the retard limit may be calculated using a model in consideration of LNV (Lowest Normalized Value).

The ECU 10 sets an efficiency of MBT based on the mfb50 position at the retard limit and the map 152 determined beforehand. The map 152 defines a relation between the mfb50 position at the retard limit and the efficiency of MBT. The efficiency of MBT becomes "1" if the mfb50 position at the retard limit is a given crank angle on the advance side, and approaches zero as the mfb50 position at the retard limit is retarded.

The map 152 defines a reference curve (refer to a solid line), and this curve is corrected according to the operating state of the engine 1. The map 153 relates to an efficiency slope for correcting the reference curve of the map 152. The map 153 defines a relation of the engine speed, the filling efficiency, and the efficiency slope. The efficiency slope decreases as the engine speed decreases and the load decreases, and increases as the engine speed increases and the load increases.

The reference curve of the map 152 illustrated by the solid line falls downward as the efficiency slope defined based on the map 153 increases, as illustrated by a broken line, and it goes up upward as the efficiency slope decreases. The ECU 10 defines the efficiency of MBT at the retard limit based on the map 152 which is corrected by the efficiency slope (refer to one-dot chain line arrows).

The ECU 10 defines the thermal efficiency at the retard limit based on the efficiency of MBT and the map 154 determined beforehand. The map 154 defines a relation of the engine speed, the filling efficiency, and the thermal efficiency at MBT. The thermal efficiency at MBT decreases as the engine speed decreases and the load decreases, and increases as the engine speed increases and the load increases. The ECU 10 defines the thermal efficiency at MBT in an operating state of the engine 1 based on the engine speed, the filling efficiency, and the map 154, and calculates the thermal efficiency at the retard limit based on the thermal efficiency at MBT and the efficiency of MBT defined in the map 152.

When the thermal efficiency at the retard limit is calculated, the ECU 10 then calculates a torque corresponding to the thermal efficiency concerned (i.e., the retard limit torque) based on the thermal efficiency at the retard limit, a volume per cylinder, and a calorific value of an injection amount at which the air-fuel ratio of the mixture gas becomes the lean air-fuel ratio.

Figure 16:
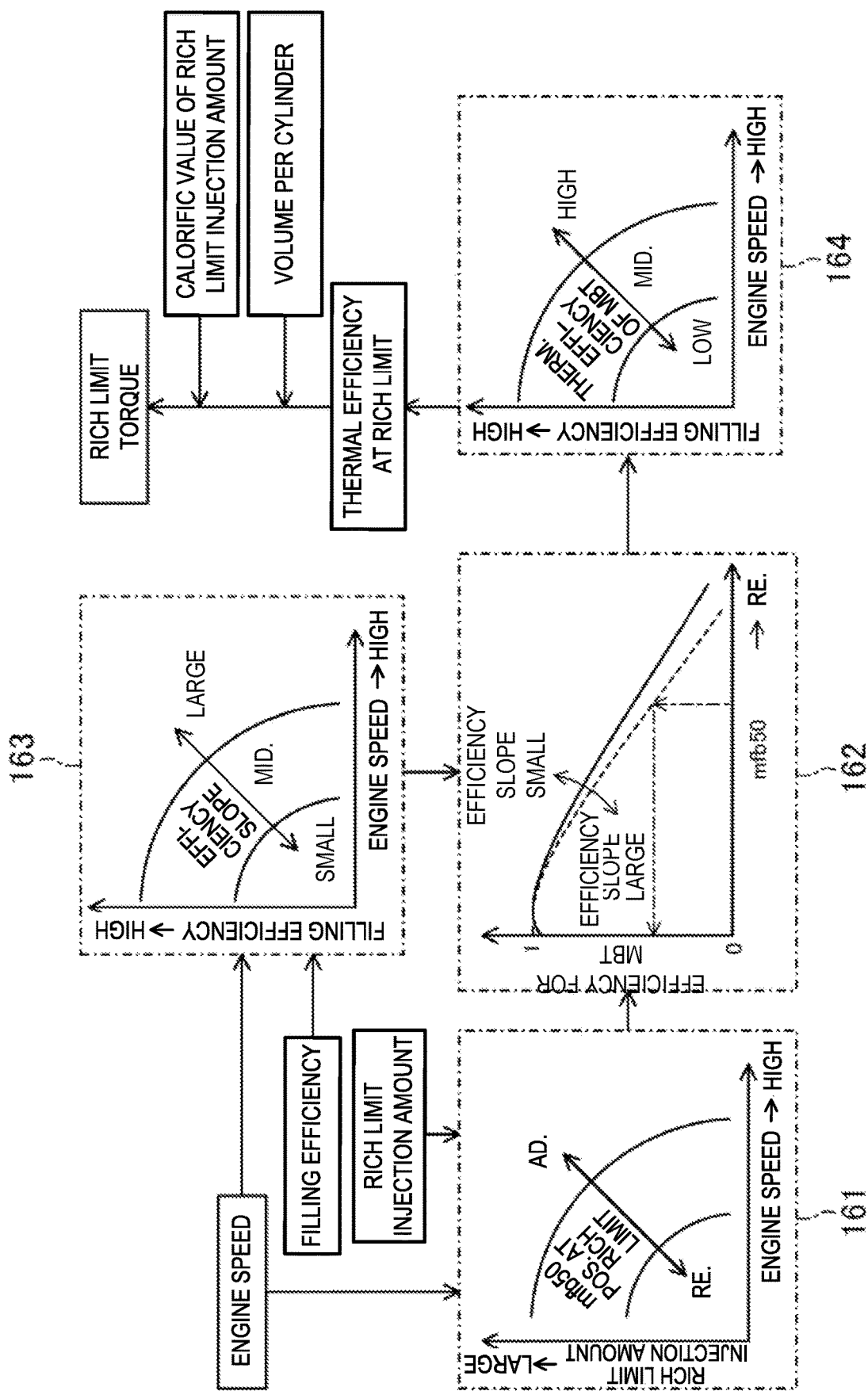
FIG. 16 is a view illustrating a calculation procedure at the rich limit torque.

FIG. 16 is a block diagram illustrating a calculation procedure of the rich limit torque. The ECU 10 calculates the rich limit torque based on the thermal efficiency of the engine 1 at the rich limit. The thermal efficiency of the engine 1 at the rich limit is calculated based on the thermal efficiency of the engine 1 at MBT and the mfb50 position at the rich limit. The mfb50 position at the rich limit indicates a crank angle at which the mass combustion rate becomes 50% in a waveform when the mixture gas of the air-fuel ratio at which the generation of raw $NO_x$ is reduced combusts.

The ECU 10 calculates the mfb50 position at the rich limit based on the engine speed, a rich limit injection amount, and the map 161 determined beforehand. The map 161 defines a relation of the engine speed, the rich limit injection amount, and the mfb50 position. The rich limit injection amount is an upper limit of the injection amount below which the generation of raw $NO_x$ is reduced. The mfb50 position at the rich limit is retarded as the engine speed decreases and the load decreases, and is advanced as the engine speed increases and the load increases.

The map 162, the map 163, and the map 164 in FIG. 16 are the same as the map 152, the map 153, and the map 154 in FIG. 15, respectively.

The ECU 10 sets the efficiency of MBT based on the mfb50 position at the rich limit and the map 162 determined beforehand (refer to the one-dot chain line arrows).

The reference curve (solid line) of the map 162 is corrected by the efficiency slope which is defined by the map 163 and the operating state of the engine 1.

The ECU 10 defines the thermal efficiency at the rich limit based on the efficiency of MBT and the map 164 determined beforehand. The map 164 defines a relation of the engine speed, the filling efficiency, and the thermal efficiency at MBT.

When the thermal efficiency at the rich limit is calculated, the ECU 10 then calculates the torque corresponding to the thermal efficiency concerned (i.e., the rich limit torque) based on the thermal efficiency at the rich limit, a volume per cylinder, and a calorific value at the rich limit injection amount (a fuel injection amount in the reduced-cylinder operation during the change).

Returning to the flowchart of FIG. 14.

The ECU 10 compares the calculated rich limit torque with the target torque. Then, the ECU 10 determines whether the rich limit torque is below the target torque (Step S149). As a result, if the rich limit torque is below the target torque, the preparation control process returns. The preparation control process repeats the processing of Steps S141-S149 described above until the rich limit torque becomes above the target torque. On the other hand, if the rich limit torque becomes above the target torque, the process shifts to the reduced-cylinder operation (Step S150).

If the process shifts to the reduced-cylinder operation when the rich limit torque is below the target torque (i.e., when the target torque is larger than the rich limit torque), the number of combustion chambers 17 where combustion is performed decreases, and the amount of fuel injected into the combustion chambers 17 increases accordingly. Therefore, the A/F becomes relatively rich, which is a state where raw $NO_x$ may occur.

On the other hand, if the process shifts to the reduced-cylinder operation when the rich limit torque becomes above the target torque (i.e., when the target torque is smaller than the rich limit torque), the degradation of the emission performance can be prevented because the state where the generation of raw $NO_x$ is suppressed can be maintained.

Moreover, if the process does not transit to the reduced-cylinder operation even if the rich limit torque becomes above the target torque (i.e., even if the rich limit torque exceeds the target torque), the air-fuel ratio of the mixture gas becomes excessively lean to cause unstable SPCCI combustion, in some cases, to cause a misfire (exceeding the lean limit).

The ECU 10 ends the fuel amount maintain processing described above at the given air-fuel ratio at which the air amount reaches the given suitable amount (not excessive or insufficient), and starts the reduced-cylinder operation. That is, by shifting to the reduced-cylinder operation when the rich limit torque becomes above the target torque, the change can be achieved in a short period of time, and the stable SPCCI combustion can be realized even during the transition period. Therefore, the smooth change can be performed.

By the transition to the reduced-cylinder operation, the number of cylinders where SPCCI combustion is performed decreases from four cylinders to two cylinders, and the ECU 10 changes (increases) the amount of fuel injected into the combustion chambers 17 where SPCCI combustion is performed into the target fuel amount of the reduced-cylinder operation. Moreover, the ECU 10 sets the reduced-cylinder operation change flag to 0 (Step S151). Therefore, the change from the all-cylinder operation to the reduced-cylinder operation is finished.

(Time Chart of First Preparation Control Pattern)

Figure 17:
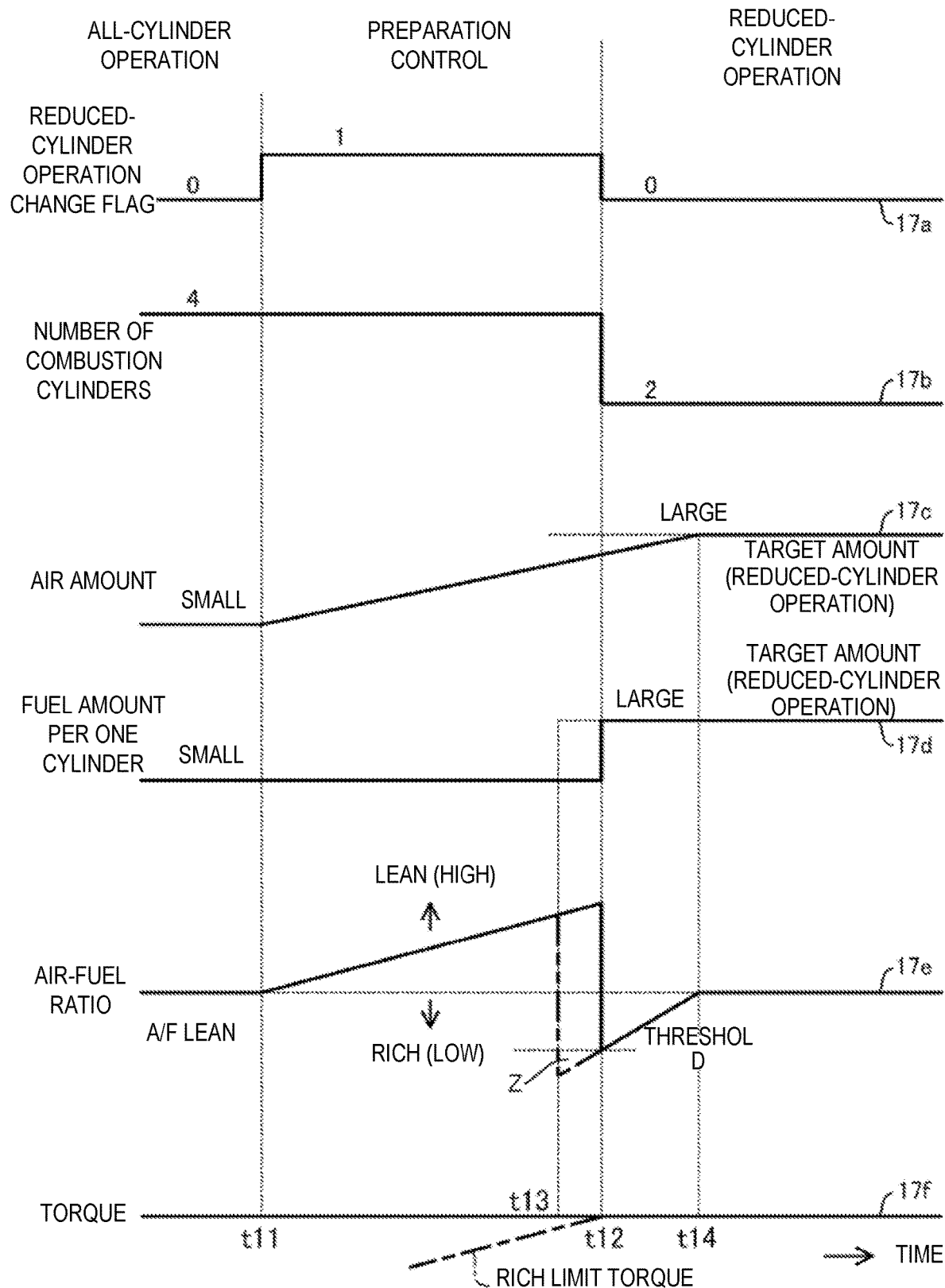
FIG. 17 is a time chart illustrating the first preparation control pattern.

FIG. 17 illustrates one example of a time chart of a pattern of the first preparation control in which the operation is changed from the all-cylinder operation to the reduced-cylinder operation. In the time chart, time progresses from the left to the right. In the time chart, changes of primary parameters used for the preparation control are illustrated.

In order to reduce the torque shock throughout a period of the preparation control, and partial periods adjacent before and after the preparation control period, the target torque of the engine 1, i.e., the total amount of fuel supplied to the engine 1 is maintained constant or substantially constant (refer to 17f). In the low-load range A1, the engine 1 before the preparation control is started operates at the given lean air-fuel ratio by SPCCI combustion of the combustion chambers 17 of all the four cylinders (refer to 17b and 17e).

When the reduced-cylinder operation change flag is changed to 1 at a time t11 (refer to 17a), the opening of the throttle valve 43 changes from small to large. If the opening of the throttle valve 43 increases, the amount of air supplied to each combustion chamber 17 increases gradually (refer to 17c).

The amount of fuel injected into each combustion chamber 17 is maintained at the target fuel amount in the all-cylinder operation during the change (refer to 17d). Thus, the air-fuel ratio of the mixture gas of each combustion chamber 17 increases to be gradually leaner (refer to 17e). Since the air-fuel ratio is leaner than the lean air-fuel ratio, there is no possibility that raw $NO_x$ occurs.

However, if the state is maintained as it is, SPCCI combustion becomes unstable and it will reach a state where misfire may occur (lean limit), and therefore, it will become impossible to perform the smooth change.

On the other hand, in this engine 1, the ECU 10 ends the preparation control at the suitable timing where the generation of raw $NO_x$ can be suppressed, before reaching the lean limit, and then changes the operation to the reduced-cylinder operation. That is, the ECU 10 shifts to the reduced-cylinder operation when the rich limit torque becomes above the target torque, as described above. In other words, the ECU 10 (cylinder count control module 10a) ends the fuel amount maintain processing in a given air-fuel ratio state where the actual air amount which is increasing reaches the given amount, and then starts the reduced-cylinder operation (a time t12). At the time t12 when the preparation control ends, the reduced-cylinder operation change flag is changed to 0 (refer to 17a).

Specifically, the given threshold (rich limit A/F) used as a reference for suppressing raw $NO_x$ is defined by the imaginary air-fuel ratio corresponding to the rich limit torque which is the same value as the target torque. The ECU 10 shifts to the reduced-cylinder operation when the given air-fuel ratio (rich air-fuel ratio), which is defined based on the actual air amount and the amount of fuel injected in the reduced-cylinder operation during the change, reaches the threshold.

On the other hand, if the operation is changed to the reduced-cylinder operation at an early timing when the rich limit torque has not become above the target torque, for example, as illustrated by a time t13, there is a possibility that raw $NO_x$ occurs because the rich air-fuel ratio is lower than the threshold, as illustrated by "Z." Therefore, the degradation of the emission performance cannot be suppressed.

On the other hand, in this engine 1, since the ECU 10 changes the operation to the reduced-cylinder operation at the suitable timing which can suppress the generation of raw $NO_x$ before reaching the lean limit without excess and insufficiency, the operation can be changed smoothly, while preventing the degradation of the emission performance.

At this time, as illustrated, the actual air amount may not have reached the target air amount, but since the air-fuel ratio then becomes leaner, there is no possibility that raw $NO_x$ occurs (refer to 17e). Then, at a time t14, when the actual air amount reaches the target air amount, the change from the all-cylinder operation to the reduced-cylinder operation is finished.

(Second Preparation Control Pattern: Change from all-Cylinder Operation to Reduced-Cylinder Operation)

Figure 18:
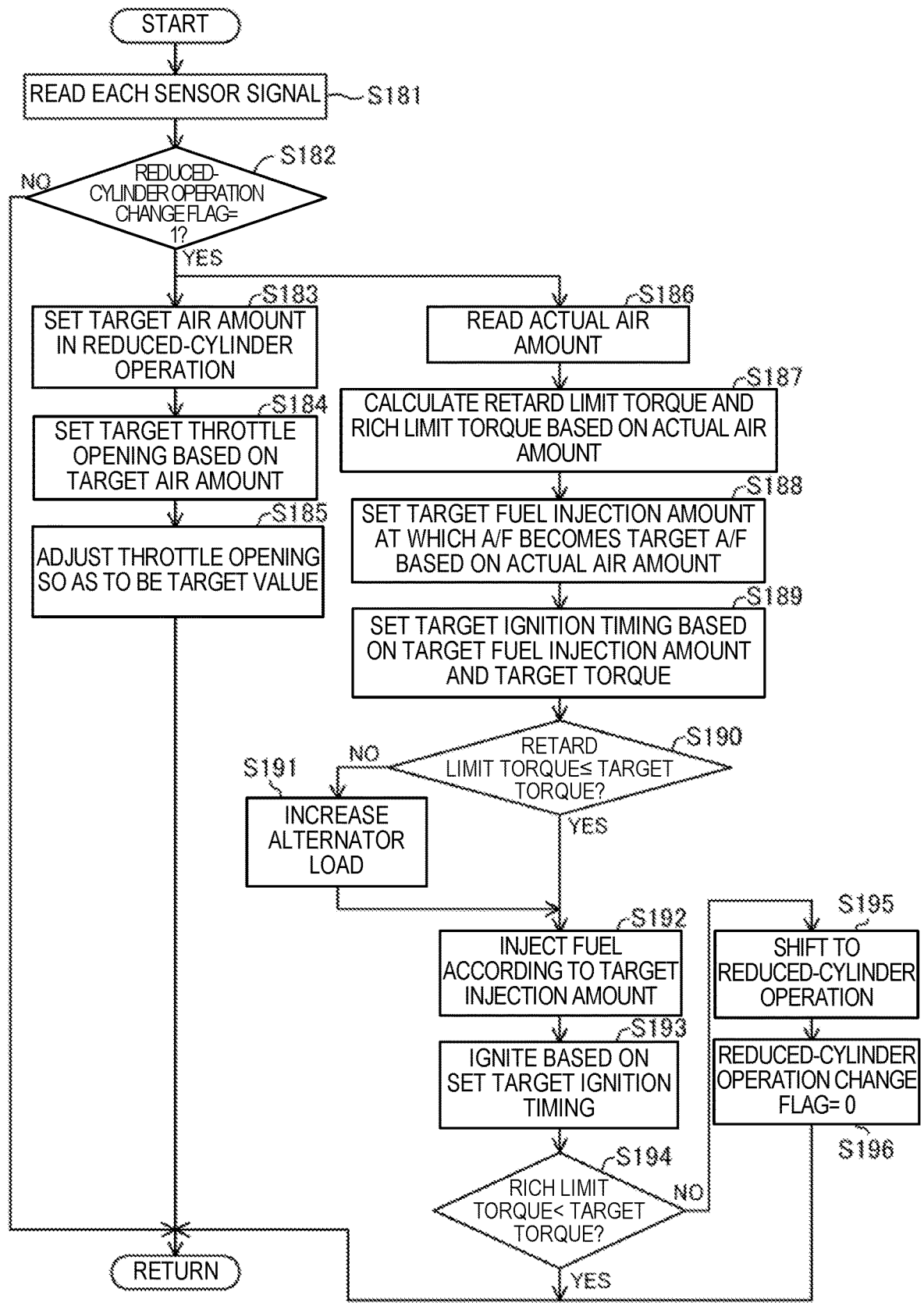
FIG. 18 is a flowchart illustrating a second preparation control pattern related to the change from the reduced-cylinder operation to the all-cylinder operation.

FIG. 18 illustrates another example of the preparation control to change the operation from the all-cylinder operation to the reduced-cylinder operation (a pattern of the second preparation control). Steps S181-S186 are the same as Steps S141-S147 (except for Step S143) in the pattern of the first preparation control described above. Therefore, description of these steps is omitted.

In this preparation control pattern, the ECU 10 reads the amount of air actually filled up in the combustion chamber 17 (Step S186), and then calculates the retard limit torque and the rich limit torque based on the read actual air amount (Step S187).

The ECU 10 sets the target fuel injection amount of the preparation control based on the actual air amount (Step S188). The target fuel injection amount set here is a fuel amount corresponding to the increase in the actual air amount, in order to maintain the lean air-fuel ratio (target A/F). The target fuel injection amount is greater than the injection amount required for the engine 1 outputting the target torque in the all-cylinder operation. That is, the ECU 10 (cylinder count control module 10a) outputs the signal to the injector 6 to perform processing in which the amount of fuel injected into each of the combustion chambers 17 is increased (the fuel amount increase processing).

Next, the target ignition timing is set based on the target fuel injection amount setting and the target torque (Step S189). The target ignition timing set here is retarded so that the increasing amount of torque due to the increase in the fuel amount is reduced. That is, the ECU 10 (cylinder count control module 10a) outputs the signal to the ignition plug 25 to retard the ignition timing (a retard processing). In SPCCI combustion, by retarding the ignition timing, the timing of SI combustion is retarded, and the timing at which CI combustion starts is also retarded. Therefore, the torque of the engine 1 can be reduced effectively.

Next, the ECU 10 determines whether the calculated retard limit torque is below the target torque (Step S190). If the retard limit torque is below the target torque, the amount of fuel to be injected can be increased by retarding the ignition timing. Therefore, since the fuel amount can also be increased according to the increase in the air amount, it can prevent that the air-fuel ratio becomes lean (the lean air-fuel ratio can be kept). As a result, the stable SPCCI combustion can be realized.

If the retard limit torque is below the target torque, the ECU 10 causes the injector 6 to inject the fuel according to the target injection amount, and then causes the ignition plug 25 to ignite the fuel according to the target ignition timing setting (Steps S192 and S193).

On the other hand, if the retard limit torque exceeds the target torque, the ignition timing cannot be retarded any more.

Thus, the ECU 10 (cylinder count control module 10a) performs a processing to restrict the ignition timing below the retarding amount at that time, after the retard processing reaches the limit (a restricted retard processing).

If the amount of fuel to be injected is increased while the retarding of ignition timing is restricted, the torque outputted from the engine 1 also increases and the torque shock occurs. In order to reduce the torque shock, if the increase in the amount of fuel to be injected is also restricted, there is a possibility that the air-fuel ratio of the mixture gas becomes lean and SPCCI combustion becomes unstable.

Therefore, in such a case, it is desirable that the ECU 10 (cylinder count control module 10a) performs a processing to divert a part of the torque outputted from the engine 1 (a load adjustment processing), while performing the restricted retard processing (Step S191).

For example, the ECU 10 may output a signal to the alternator 57 which is an auxiliary machinery to increase the load. Thus, it becomes possible to continue the increase in the amount of fuel to be injected, while suppressing the generation of the torque shock. As a result, even after the retard processing reaches the limit, it can prevent that the air-fuel ratio becomes lean (the lean air-fuel ratio can be kept). As a result, the stable SPCCI combustion can continuously be realized. Note that unless the lean limit is reached, the retard processing or the restricted retard processing may be continued, while permitting that the air-fuel ratio becomes lean.

Next, the ECU 10 compares the calculated rich limit torque with the target torque. Then, the ECU 10 determines whether the rich limit torque is below the target torque (Step S194). As a result, if the rich limit torque is below the target torque, the preparation control process returns. The preparation control process repeats the processings at Steps S181-S194 described above until the rich limit torque becomes above the target torque.

On the other hand, when the rich limit torque becomes above the target torque, the process shifts to the reduced-cylinder operation (Step S195). That is, the ECU 10 ends the fuel amount increase processing and the retard processing (or the restricted retard processing) described above at the given air-fuel ratio where the air amount reaches the given amount without excess and insufficiency, and then starts the reduced-cylinder operation.

By the transition to the reduced-cylinder operation, the number of cylinders where SPCCI combustion is performed decreases from four cylinders to two cylinders, and the ECU 10 changes (increases) the amount of fuel injected into the combustion chambers where SPCCI combustion is performed to the target fuel amount of the reduced-cylinder operation. Since the air amount and the fuel amount during the change are close to the target air amount and the target fuel amount of the reduced-cylinder operation, compared with the first preparation control pattern, the change in the state at the startup of the reduced-cylinder operation is small and, thus, the operation can be changed smoothly. Moreover, the ECU 10 sets the reduced-cylinder operation change flag to 0 (Step S196). Thus, the change from the all-cylinder operation to the reduced-cylinder operation is finished.
(Time Chart of Second Preparation Control Pattern)

Figure 19:
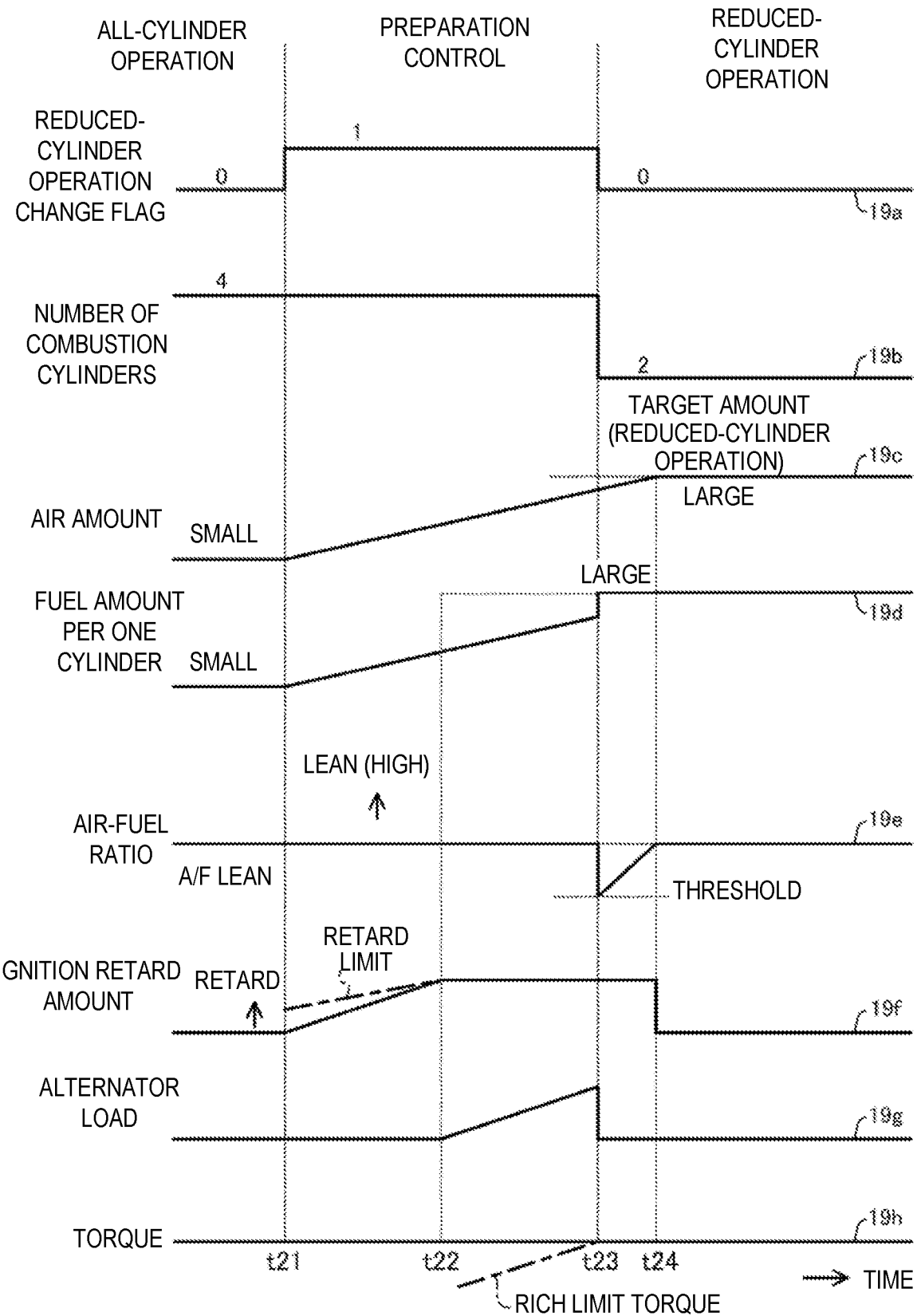
FIG. 19 is a time chart illustrating the second preparation control pattern.

FIG. 19 illustrates one example of a time chart of the second preparation control pattern in which the operation is changed from the all-cylinder operation to the reduced-cylinder operation, similar to FIG. 17.

Here, the ignition retarding amount means a retarding amount from the ignition timing based on the normal engine control. Note that since the speed of SI combustion becomes slower when the air-fuel ratio becomes lean, the normal ignition timing is controlled to be advanced accordingly.

Since the torque shock is reduced throughout the preparation control period and the partial periods adjacent before and after to the preparation control period, the target torque of the engine 1, i.e., the total amount of fuel supplied to the engine 1 is maintained constant or substantially constant (refer to 19*h*). In the low-load range, the engine 1 before the preparation control is started is operated by SPCCI combustion with the combustion chambers 17 of all the four cylinders at the given lean air-fuel ratio (refer to 19*b* and 19*e*).

When the reduced-cylinder operation change flag is changed to 1 at a time t21 (refer to 19*a*), the opening of the throttle valve 43 changes from small to large, and the amount of air supplied to each combustion chamber 17 increases gradually (refer to 19*c*).

The amount of fuel injected into each combustion chamber 17 is increased according to the actual air amount so that the air-fuel ratio is maintained at the lean air-fuel ratio (refer to 19*d*). In order to maintain the target torque, the ignition timing is retarded according to the increase in the fuel amount (refer to 19*f*). The retarding amount increases as the air amount and the fuel amount increase.

In the illustrated preparation control pattern, the target torque exceeds the retard limit torque at a time t22. That is, the ignition retarding amount reaches the retard limit (refer to 19*f*). Since the ignition timing cannot be retarded any more, the ECU 10 maintains the retarding amount of the ignition timing. Thus, the stability of SPCCI combustion is secured.

In order to continue the increase in the injecting fuel amount, the ECU 10 executes the load adjustment processing in which the load of alternator 57 is increased, in addition to such a restricted retard processing (refer to 19*g*). As a result, the increase in the injecting fuel amount can be continued, while maintaining the air-fuel ratio at the lean air-fuel ratio, thereby keeping the torque constant.

Then, at a time t23, when the rich limit torque becomes above the target torque (when the imaginary rich air-fuel ratio reaches the given threshold), the fuel amount increase processing and the retard processing (restricted retard processing) which are described above are ended, and the reduced-cylinder operation is then started. At the time t23 when the preparation control ends, the reduced-cylinder operation change flag is changed to 0 (refer to 19*a*). Then, at a time t24, when the actual air amount reaches the target air amount, the change from the all-cylinder operation to the reduced-cylinder operation is finished.
(Third Preparation Control Pattern: Change from Reduced-Cylinder Operation to all-Cylinder Operation)

Figure 20:
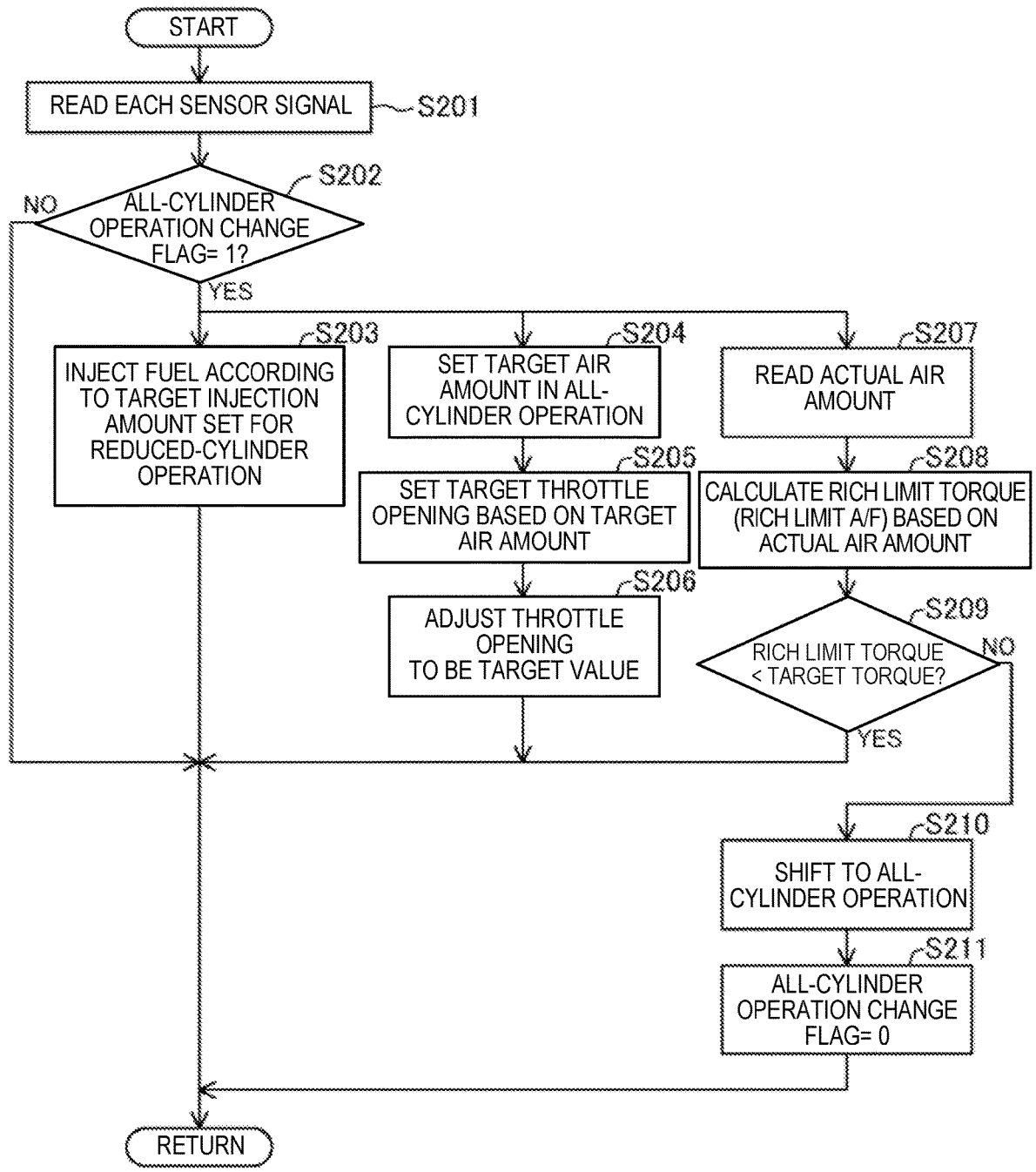
FIG. 20 is a flowchart illustrating a third preparation control pattern related to a change from the all-cylinder operation to the reduced-cylinder operation.

FIG. 20 illustrates one example of the preparation control to change the operation from the reduced-cylinder operation to the all-cylinder operation (pattern of a third preparation control).

The third preparation control pattern is substantially the same as the first preparation control pattern, and only the difference is that the operating condition in question is interchanged between the all-cylinder operation and the reduced-cylinder operation. That is, Steps S141-S151 in FIG. 14 corresponds to Steps S201-S211 in FIG. 20, respectively. In addition, the increase/decrease in the fuel amount and the air amount, and the processings accompanying the increase/decrease are also reversed. Therefore, description thereof is omitted, and only the different contents are described with the following time chart.
(Time Chart of Third Preparation Control Pattern)

Figure 21:
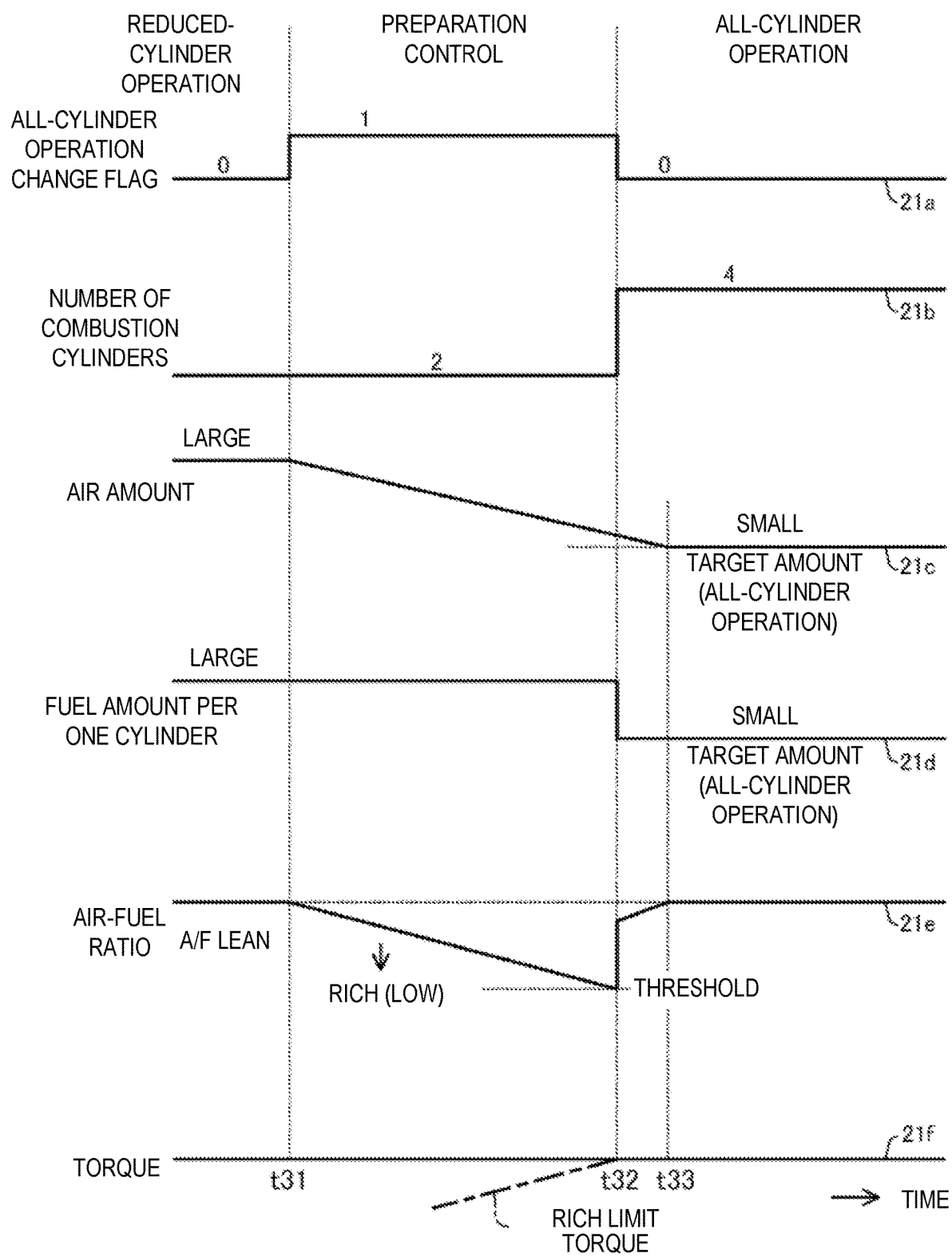
FIG. 21 is a time chart illustrating the third preparation control pattern.

FIG. 21 illustrates one example of a time chart of the third preparation control pattern to change the operation from the reduced-cylinder operation to the all-cylinder operation, similar to FIG. 17.

In order to reduce the torque shock throughout the preparation control period, and the partial periods adjacent before and after the preparation control period, the target torque of the engine 1, i.e., the total amount of fuel supplied to the engine 1 is maintained constant or substantially constant (refer to 21*f*). In the low-load range, the engine 1 before the preparation control is started operates by SPCCI combustion with the combustion chambers 17 of two cylinders at the given lean air-fuel ratio (refer to 21*b* and 21*e*).

When the all-cylinder operation change flag is changed to 1 at a time t31 (refer to 21*a*), the opening of the throttle valve 43 changes from large to small, and the amount of air supplied to each combustion chamber 17 decreases gradually (refer to 21*c*).

The amount of fuel injected into the combustion chambers 17 of two cylinders is maintained at the target fuel amount of the reduced-cylinder operation during the change (refer to 21*d*). Thus, the air-fuel ratio in the combustion chambers 17 where SPCCI combustion is performed decreases, and becomes gradually richer (refer to 21*e*).

Therefore, if this continues as it is, the possibility that raw $NO_x$ occurs arises.

On the other hand, in this engine 1, the ECU 10 ends the preparation control at a suitable timing before raw $NO_x$ may be generated, and then changes the operation to the all-cylinder operation. That is, the ECU 10 shifts to the all-cylinder operation, when the rich limit torque becomes above the target torque, as described above. In other words, the ECU 10 (cylinder count control module 10*a*) ends the fuel amount maintain processing at the given air-fuel ratio where the actual air amount which is decreasing reaches the given amount, and then starts the all-cylinder operation (time t32).

Since the amount of fuel injected to the combustion chambers 17 where SPCCI combustion is performed in the reduced-cylinder operation decreases by changing to the all-cylinder operation, the air-fuel ratio becomes lean. Therefore, the generation of raw $NO_x$ is suppressed. Since the operation is changed smoothly at the early timing without excess and insufficiency, the stable change can be performed. At the time t32 where the preparation control ends, the all-cylinder operation change flag is changed to 0 (refer to 21*a*).

At this time, as illustrated, the actual air amount may not have reached the target air amount, but since the air-fuel ratio then becomes leaner, there is no possibility that raw $NO_x$ occurs (refer to 21*e*). Then, at a time t33, when the actual air amount reaches the target air amount, the change from the reduced-cylinder operation to the all-cylinder operation is finished.

OTHER EMBODIMENTS

Note that the technology disclosed herein is not limited to be applied to the engine 1 of the configuration described above. The engine 1 may adopt various configurations.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
10 ECU (Control Device)
10a Cylinder Count Control Module
17 Combustion Chamber
25 Ignition Plug
3 Piston
43 Throttle Valve (Air Adjusting Part)
57 Alternator
6 Injector (Fuel Injection Valve)

What is claimed is:

1. A control device for a compression ignition engine, the engine comprising:
a plurality of cylinders;
pistons configured to reciprocate inside the plurality of cylinders, respectively;
a plurality of combustion chambers, each defined in the cylinders so that displacement of the combustion chamber changes according to the reciprocation of the piston;
a throttle valve configured to adjust an amount of air supplied into each of the combustion chambers;
ignition plugs disposed so as to be oriented to the respective combustion chambers; and
fuel injection valves configured to inject fuel into the respective combustion chambers,
the control device comprising circuitry and a sensor configured to measure a parameter relevant to an operation of the engine,
wherein the control device is configured to execute a cylinder count control module connected with the throttle valve, the ignition plugs, the fuel injection valves, and the sensor, to output signals to the throttle valve, the ignition plug, and the fuel injection valves based on the signal inputted from the sensor so that a compression ignition combustion is started by the ignition plug igniting a mixture gas formed by the fuel injection valves injecting fuel into each of the combustion chambers, and configured to change between an all-cylinder operation in which combustion is performed in all of the plurality of combustion chambers and a reduced-cylinder operation in which combustion is not performed in some of the combustion chambers by suspending the fuel injection into the combustion chambers, according to an operating state of the engine, when the compression ignition combustion is performed at a given lean air-fuel ratio higher than a stoichiometric air fuel ratio,
wherein the cylinder count control module executes a preparation control to change the operation of the engine from the all-cylinder operation to the reduced-cylinder operation when a change demand from the all-cylinder operation to the reduced-cylinder operation is received, and
wherein in the preparation control to change the operation of the engine from the all-cylinder operation to the reduced-cylinder operation:
the cylinder count control module outputs the signal to the throttle valve to execute an air amount increase processing in which an amount of air supplied to each of the combustion chambers is increased during the change of the operation of the engine from the all-cylinder operation to the reduced-cylinder operation, compared with the amount of air before the preparation control is started,
the cylinder count control module outputs the signal to the fuel injection valves to execute a fuel amount increase processing in which an amount of fuel injected into each of the combustion chambers is increased during the change of the operation of the engine from the all-cylinder operation to the reduced-cylinder operation, compared with the amount of fuel before the preparation control is started,
the cylinder count control module outputs the signal to the ignition plug to execute a retard processing in which an ignition timing is retarded, and
the cylinder count control module ends the fuel amount increase processing and the retard processing when the cylinder count control module determines that an air-fuel ratio is in a given air-fuel ratio state where the air amount reaches a given amount, and starts the reduced-cylinder operation.

2. The control device of claim 1, wherein the air-fuel ratio state is determined when the cylinder count control module determines that a rich air-fuel ratio defined based on the amount of air, and the amount of fuel injected in the reduced-cylinder operation during the change, reaches a given threshold.

3. The control device of claim 2, wherein the threshold is a value lower than the lean air-fuel ratio.

4. The control device of claim 1, wherein a restricted retard processing in which the ignition timing is restricted below a retarding amount at that time is performed after the retard processing reaches a limit.

5. The control device of claim 4, wherein a load adjustment processing in which a part of output of the engine is diverted to some other purposes is performed, in addition to the restricted retard processing.

6. The control device of claim 1, wherein the control device stores a given all-cylinder operating range and a given reduced-cylinder operating range, and
wherein when the operating state of the engine is determined to be within the reduced-cylinder operating range, the control device performs the reduced-cylinder operation by suspending the fuel injection by the fuel injection valves of some of the cylinders, and opening and closing of intake valves and exhaust valves of the cylinders are permitted during the reduced-cylinder operation.

7. The control device of claim 1, wherein
the control device determines an actual amount of air in each of the combustion chambers;
the control device calculates a rich limit torque based on the actual amount of air in each of the combustion chambers, the rich limit torque obtained when combustion is performed when the cylinder count control module determines that the air-fuel ratio is in the given air-fuel ratio state where the air amount reaches the given amount;

the control device determines whether the rich limit torque is below a target torque that is configured based on a signal from an accelerator opening sensor;

when the rich limit torque is below the target torque, the control device repeatedly executes the air amount increase processing, the fuel amount increase processing, and the retard processing of the preparation control until the rich limit torque exceeds the target torque; and when the rich limit torque exceeds the target torque, then the control device shifts the operation of the engine to the reduced-cylinder operation.

8. A control device for a compression ignition engine, the engine comprising:

a plurality of cylinders;

pistons configured to reciprocate inside the plurality of cylinders, respectively;

a plurality of combustion chambers, each defined in the cylinders so that displacement of the combustion chamber changes according to the reciprocation of the piston;

a throttle valve configured to adjust an amount of air supplied into each of the combustion chambers;

ignition plugs disposed so as to be oriented to the respective combustion chambers; and fuel injection valves configured to inject fuel into the respective combustion chambers, the control device comprising circuitry and a sensor configured to measure a parameter relevant to an operation of the engine, wherein the control device is configured to execute a cylinder count control module connected with the throttle valve, the ignition plug, the fuel injection valves, and the sensor, to output signals to the throttle valve, the ignition plug, and the fuel injection valves based on the signal inputted from the sensor so that a compression ignition combustion is started by the ignition plug igniting a mixture gas formed by the fuel injection valves injecting fuel into each of the combustion chambers, and configured to change between an all-cylinder operation in which combustion is performed in all of the plurality of combustion chambers and a reduced-cylinder operation in which combustion is not performed in some of the combustion chambers by suspending the fuel injection into the combustion chambers, according to an operating state of the engine, when the compression ignition combustion is performed at a given lean air-fuel ratio higher than a stoichiometric air fuel ratio, wherein the cylinder count control module executes a preparation control to change the operation of the engine from the reduced-cylinder operation to the all-cylinder operation when a change demand from the reduced-cylinder operation to the all-cylinder operation is received, wherein in the preparation control to change the operation of the engine from the reduced-cylinder operation to the all-cylinder operation:

the cylinder count control module outputs the signal to the throttle valve to execute an air amount decrease processing in which an amount of air supplied to each of the combustion chambers is decreased during the change the operation of the engine from the reduced-cylinder operation to the all-cylinder operation, compared with the amount of air before the preparation control is started, the cylinder count control module outputs the signal to the fuel injection valve to execute a fuel amount maintain processing in which an amount of fuel injected into each of the combustion chambers is maintained during the change the operation of the engine from the reduced-cylinder operation to the all-cylinder operation, and the cylinder count control module ends the fuel amount maintain processing when the cylinder count control module determines that an air-fuel ratio is in a given air-fuel ratio state where the air amount reaches a given amount, and starts the all-cylinder operation, wherein the control device determines an actual amount of air in each of the combustion chambers;

wherein the control device calculates a rich limit torque based on the actual amount of air in each of the combustion chambers, the rich limit torque obtained when combustion is performed when the cylinder count control module determines that the air-fuel ratio is in the given air-fuel ratio state where the air amount reaches the given amount;

wherein the control device determines whether the rich limit torque is below a target torque that is configured based on a signal from an accelerator opening sensor;

wherein when the rich limit torque is below the target torque, the control device repeatedly executes the air amount decrease processing and the fuel amount maintain processing of the preparation control until the rich limit torque exceeds the target torque, and wherein when the rich limit torque exceeds the target torque, then the control device shifts the operation of the engine to the all-cylinder operation.

9. The control device of claim 8, wherein the control device stores a given all-cylinder operating range and a given reduced-cylinder operating range, and wherein when the operating state of the engine is determined to be within the reduced-cylinder operating range, the control device performs the reduced-cylinder operation by suspending the fuel injection by the fuel injection valves of some of the cylinders, and opening and closing of intake valves and exhaust valves of the cylinders are permitted during the reduced-cylinder operation.

* * * * *